(12) United States Patent
Tanabe et al.

(10) Patent No.: US 10,656,320 B2
(45) Date of Patent: May 19, 2020

(54) LIGHTING DEVICE AND DISPLAY DEVICE

(71) Applicant: Funai Electric Co., Ltd., Daito, Osaka (JP)

(72) Inventors: Noritaka Tanabe, Osaka (JP); Seiji Takemoto, Hyogo (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 16/275,833

(22) Filed: Feb. 14, 2019

(65) Prior Publication Data

US 2019/0257995 A1    Aug. 22, 2019

(30) Foreign Application Priority Data

Feb. 22, 2018   (JP) ................................. 2018-029740

(51) Int. Cl.
| | |
|---|---|
| *F21V 8/00* | (2006.01) |
| *G02B 19/00* | (2006.01) |
| *G02F 1/1333* | (2006.01) |

(52) U.S. Cl.
CPC .......... *G02B 6/003* (2013.01); *G02B 6/0031* (2013.01); *G02B 6/0088* (2013.01);
(Continued)

(58) Field of Classification Search
CPC .... G02B 6/003; G02B 6/0096; G02B 6/0031; G02B 6/0088; G02B 19/0028;
(Continued)

(56) References Cited

U.S. PATENT DOCUMENTS

| | | | | |
|---|---|---|---|---|
| 2,215,900 A | * | 9/1940 | Bitner ....................... | F21V 5/04 362/309 |
| 3,803,402 A | * | 4/1974 | Nasu ................ | B29D 11/00009 362/360 |

(Continued)

FOREIGN PATENT DOCUMENTS

| | | |
|---|---|---|
| CN | 101373046 B | 9/2010 |
| CN | 101915995 A | 12/2010 |

(Continued)

OTHER PUBLICATIONS

The partial European Search Report of the European Application No. 19158023.2, dated Jul. 22, 2019.
(Continued)

*Primary Examiner* — Jong-Suk (James) Lee
*Assistant Examiner* — Christopher E Dunay
(74) *Attorney, Agent, or Firm* — Global IP Counselors, LLP

(57) ABSTRACT

A lighting device includes at least one light source, and a lens. The lens directs light emitted from the at least one light source. The lens has a concave component with an inner bottom face and an inner face, the light emitted from the at least one light source being incident on the concave component, an emission face located on an opposite side from the concave component, and an outer face located to the side of the concave component. The inner face forms a convex face that faces toward inside of the concave component. The outer face reflects the light that has entered the lens through the inner face toward the emission face.

19 Claims, 7 Drawing Sheets

(52) U.S. Cl.
CPC ..... *G02B 19/0028* (2013.01); *G02B 19/0061* (2013.01); *G02F 1/133308* (2013.01); *G02F 2001/13332* (2013.01); *G02F 2001/13314* (2013.01)

(58) Field of Classification Search
CPC .............. G02B 19/0061; G02B 6/0023; G02B 6/0028; F21S 2/005; F21S 4/28; F21V 7/0091
See application file for complete search history.

(56) References Cited

U.S. PATENT DOCUMENTS

| | | | | |
|---|---|---|---|---|
| 5,428,912 | A * | 7/1995 | Grondal | G02B 6/0055 362/800 |
| 7,798,677 | B2 * | 9/2010 | Huang | H04N 9/315 362/296.04 |
| 9,696,006 | B2 * | 7/2017 | Hu | G02B 19/0071 |
| 2002/0080615 | A1 * | 6/2002 | Marshall | F21V 5/04 362/333 |
| 2008/0030974 | A1 | 2/2008 | Abu-Ageel | |
| 2008/0231772 | A1 * | 9/2008 | Hung | F21V 5/04 349/65 |
| 2009/0052193 | A1 * | 2/2009 | Zweig | G02B 6/0018 362/327 |
| 2009/0128921 | A1 * | 5/2009 | Roth | F21V 5/04 359/641 |
| 2009/0268469 | A1 | 10/2009 | Huang et al. | |
| 2010/0027256 | A1 * | 2/2010 | Kinoshita | F21V 5/04 362/235 |
| 2010/0135036 | A1 * | 6/2010 | Matsuba | F21S 41/322 362/516 |
| 2010/0208490 | A1 * | 8/2010 | Tsuchiya | G02B 6/003 362/606 |
| 2011/0141734 | A1 * | 6/2011 | Li | F21V 5/04 362/235 |
| 2012/0092856 | A1 | 4/2012 | Zhang et al. | |
| 2019/0063694 | A1 * | 2/2019 | Kang | G02B 3/00 |

FOREIGN PATENT DOCUMENTS

| | | |
|---|---|---|
| JP | 2005-347224 A | 12/2005 |
| WO | 2006/129570 A1 | 12/2006 |
| WO | 2011/076213 A1 | 6/2011 |
| WO | 2011/076214 A1 | 6/2011 |

OTHER PUBLICATIONS

The extended European search report for the corresponding European application No. 19158023.2, dated Nov. 28, 2019.

* cited by examiner

LIGHTING DEVICE AND DISPLAY DEVICE

CROSS-REFERENCE TO RELATED APPLICATIONS

This application claims priority to Japanese Patent Application No. 2018-029740 filed on Feb. 22, 2018. The entire disclosure of Japanese Patent Application No. 2018-029740 is hereby incorporated herein by reference.

BACKGROUND

Field of the Invention

The present invention generally relates to a lighting device. The present invention also relates to a display device with a lighting device.

Background Information

Generally, in lighting devices, a lens is used to efficiently guide diffused light emitted from a light source such as an LED (light emitting diode) in a desired direction. For example, a light irradiation device is known in which the light source is an LED element and which is used for spot lighting (see PCT International Publication No. WO2006/129570 (Patent Literature 1), for example). In this light irradiation device, the LED element is provided to the proximal end concave component of the lens. Also, in the lens, a central convex lens part is formed at the central portion of the distal end face of the lens, and a ring-shaped convex lens part having a different curvature is formed at the distal end face around the central convex lens part. The side face of the lens is formed as a curved bulging face. Some of the light emitted from the LED element is incident on the lens from the bottom face of the proximal end concave component and emitted to the outside from the central convex lens part. The rest of the light is incident on the lens from the side face of the proximal end concave component, is reflected by the curved bulging face, and is then emitted to the outside from the ring-shaped convex lens parts.

SUMMARY

However, with the lens of Patent Literature 1, some of the light incident on the lens from the side face of the proximal end concave component can be directly incident on the ring-shaped convex lens part without being reflected by the curved bulging face. The incident angle of the light directly incident on the ring-shaped convex lens part is very different from the incident angle of the light reflected by the curved bulging face on the ring-shaped convex lens part. Thus, the directly incident light can be reflected by the ring-shaped convex lens part, or can interfere with the light reflected by the curved bulging surface outside the lens. If the light control within the lens is insufficient as described above, it can be difficult to control the direction and brightness of the light emitted from the lens.

One object is to provide a lighting device and a display device with which the light within a lens can be controlled.

[1] In view of the state of the known technology and in accordance with an aspect of the present invention, a lighting device comprises at least one light source and a lens that directs light emitted from the at least one light source. The lens has a concave component with an inner bottom face and an inner face, an emission face, and an outer face. The light emitted from the at least one light source is incident on the concave component. The emission face is located on an opposite side from the concave component. The outer face is located to the side of the concave component. The inner face forms a convex face that faces toward inside of the concave component. The outer face reflects the light that has entered the lens through the inner face toward the emission face.

Also, other objects, features, aspects and advantages of the present disclosure will become apparent to those skilled in the art from the following detailed description, which, taken in conjunction with the annexed drawings, discloses one embodiment of the lighting device and the display device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. In particular, the numerical values, shapes, materials, constituent elements, disposition positions of constituent elements, connection mode, and so forth given in the following embodiments are mere examples and are not intended to limit the present invention. Therefore, of the constituent elements in the following embodiments, those constituent elements not described in an independent claim are not necessarily required to attain the object of the present invention, but are described as forming a more favorable form.

First Embodiment 1-1. Configuration of Display Device

Figure 1:
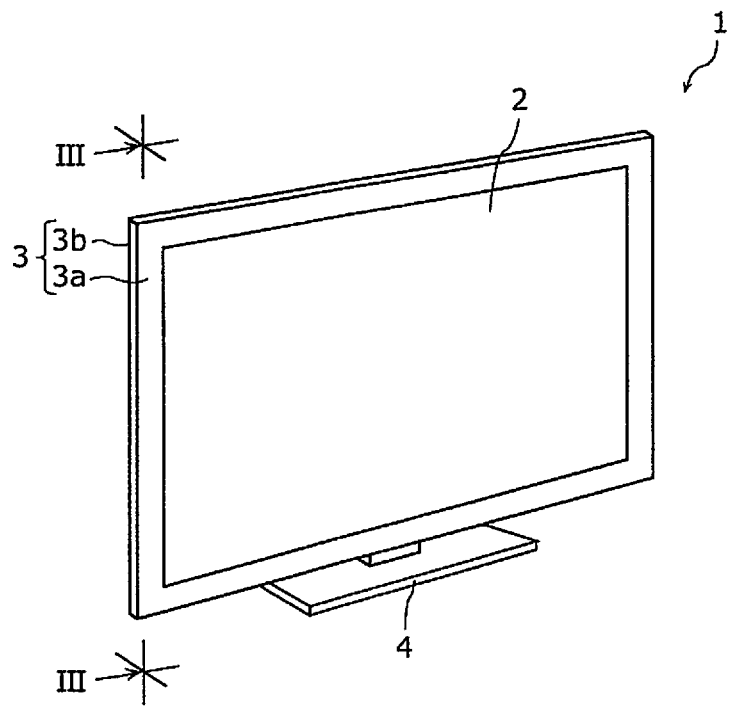
FIG. 1 is a simplified perspective view of a display device with a lighting device according a first embodiment.
Figure 2:
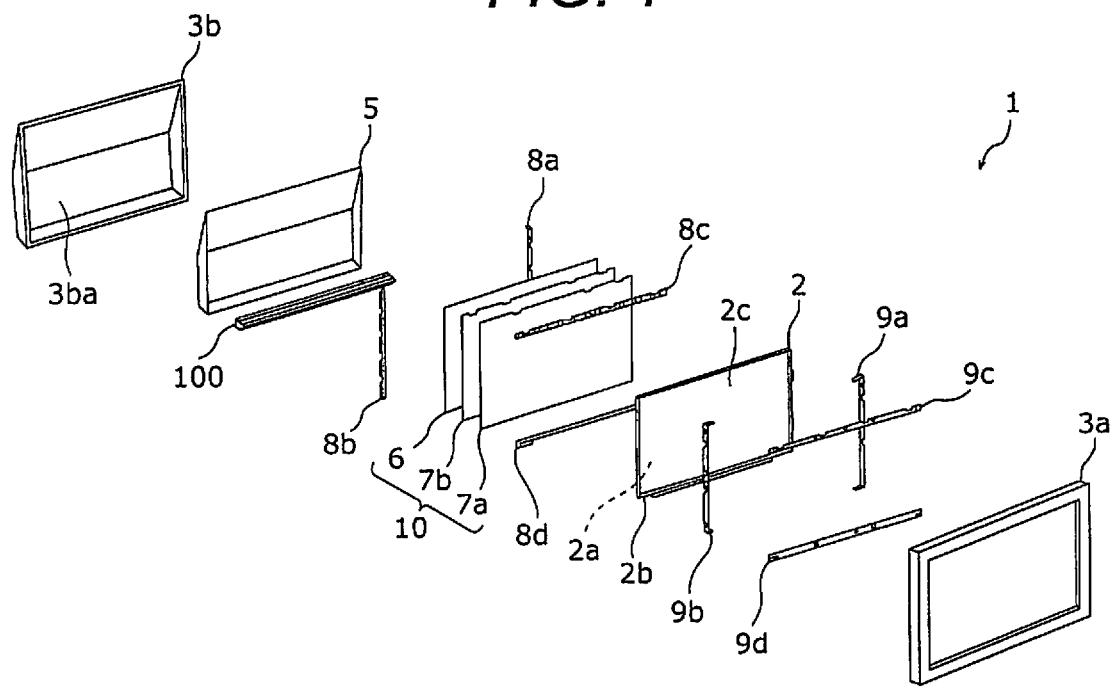
FIG. 2 is a simplified exploded perspective view of the display device in FIG. 1.
Figure 3:
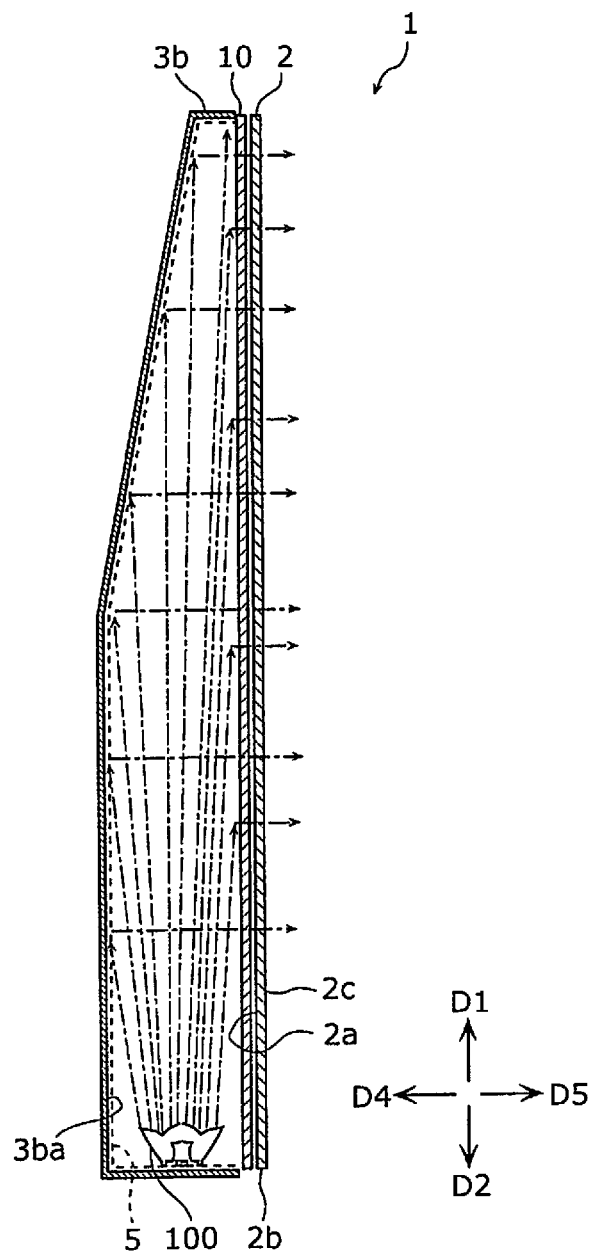
FIG. 3 is a simplified cross sectional side view of a vertical cross section perpendicular to a liquid crystal panel of the display device in FIG. 1 as seen in a direction III.

The configuration of a display device 1 comprising a lighting device 100 according to a first embodiment will be described through reference to FIGS. 1 to 3. FIG. 1 is a simplified perspective view of the display device 1 with the lighting device 100 according to the first embodiment. FIG. 2 is a simplified exploded perspective view of the display device 1 in FIG. 1. FIG. 3 is a simplified cross sectional side view of a vertical cross section perpendicular to a liquid crystal panel 2 of the display device 1 in FIG. 1 as seen in a direction III.

In this embodiment, the display device 1 is a liquid crystal television set, and the lighting device 100 will be described as forming a backlight of a liquid crystal panel 2 of the display device 1. As shown in FIGS. 1 and 2, the display device 1 comprises the liquid crystal panel 2 and a housing 3 that houses the liquid crystal panel 2. The housing 3 is made up of a front housing 3a and a rear housing 3b that are attached to each other. The front housing 3a is formed in a rectangular frame shape and is disposed so as to cover the outer peripheral portion of the flat, rectangular liquid crystal panel 2. The rear housing 3b is formed in a box shape and disposed so as to cover the entire back face 2a of the liquid crystal panel 2. A stand 4 for supporting the housing 3 from below is attached to the lower end of the rear housing 3b.

As shown in FIGS. 2 and 3, the display device 1 comprises, in addition to the liquid crystal panel 2, a reflector sheet 5, the lighting device 100, a diffuser plate 6, a pair of optical sheets 7a and 7b, four cell guides 8a to 8d, and four bezels 9a to 9d inside the housing 3. The front housing 3a, the cell guides 8a to 8d, and the bezels 9a to 9d are not depicted in FIG. 3.

The reflector sheet 5 is disposed on the inner face 3ba of the rear housing 3b and covers the entire inner face 3ba. This reflector sheet 5 covers the entire back face 2a of the liquid crystal panel 2. The reflector sheet 5 is configured to reflect the light emitted from the lighting device 100 toward the back face 2a of the liquid crystal panel 2.

The lighting device 100 forms an edge-lit backlight. In this embodiment, the lighting device 100 is disposed near the lower edge 2b, out of the four edges of the outer periphery of the liquid crystal panel 2 on the back face 2a of the rectangular liquid crystal panel 2. The lighting device 100 emits light upward from below. In FIG. 3, as indicated by the optical paths shown by one-dot chain lines, part of the light emitted by the lighting device 100 shines directly on the back face 2a of the liquid crystal panel 2, the rest of the emitted light is reflected by the reflector sheet 5, and the reflected light illuminates the back face 2a. The inner face 3ba of the rear housing 3b and the reflector sheet 5 extend from the lighting device 100 in the upward direction D1 along the liquid crystal panel 2, after which they are inclined toward the liquid crystal panel 2, such that the emitted light and the reflected light evenly irradiate the entire back face 2a. The inclined reflector sheet 5 efficiently reflects the emitted light traveling in the upward direction D1. The lighting device 100 can be disposed near an edge other than the lower edge, out of four edges of the outer periphery of the liquid crystal panel 2, or can be disposed near two or more edges. The detailed configuration of the lighting device 100 will be described below.

In the Specification and Claims herein, "above" and "upward" refer to the upward direction of gravitational force when the display device 1 is placed on a horizontal plane, and is also the direction facing from the stand 4 toward the housing 3, out of the short-side direction of the rectangular liquid crystal panel 2. "Above" and "upward" are also the direction of light emission of the lighting device 100. "Below" and "downward" refer to the downward direction of gravitational force when the display device 1 is placed on a horizontal plane, and is also the direction facing from the housing 3 toward the stand 4, out of the short-side direction of the rectangular liquid crystal panel 2. The upward direction is denoted as "D1", and the downward direction is denoted as "D2."

The diffuser plate 6 is formed in the shape of a thin, rectangular plate, and is disposed between the reflector sheet 5 and the liquid crystal panel 2. The diffuser plate 6 transmits the light emitted by the lighting device 100 and the reflected light, diffuses the emitted light and reflected light that pass through it, and emits the diffused light toward the back face 2a of the liquid crystal panel 2.

The optical sheets 7a and 7b are disposed so as to cover the diffuser plate 6 in a state of being superimposed one over the other. The optical sheets 7a and 7b guide the light emitted from the diffuser plate 6 to the back face 2a of the liquid crystal panel 2. The diffuser plate 6 and the optical sheets 7a and 7b form a rectangular plate-like light guide 10.

The cell guides 8a to 8d are each a slender frame member, and they are attached to each other to form a rectangular frame. The rectangular frame-shaped cell guides 8a to 8d are attached to the outer peripheral portion of the liquid crystal panel 2 from the back face 2a side and attached to the housing 3. The liquid crystal panel 2 is supported on its back face 2a side by the housing 3 via the cell guides 8a to 8d.

The bezels 9a to 9d are each a slender frame member, and they are attached to each other to form a rectangular frame. The rectangular frame-shaped bezels 9a to 9d are attached to the outer peripheral portion of the liquid crystal panel 2 from the front face 2c side and attached to the housing 3. The liquid crystal panel 2 is supported on its front face 2c side by the housing 3 via the bezels 9a to 9d.

The liquid crystal panel 2 is a rectangular panel. The liquid crystal panel 2 displays an image on the front face 2c. When the light emitted by the lighting device 100 and the reflected light shine on the back face 2a of the liquid crystal panel 2, the liquid crystal panel 2 displays a sharp, bright image on the front face 2c. The front face 2c here is an example of a display face.

1-2. Configuration of Lighting Device

Figure 4:
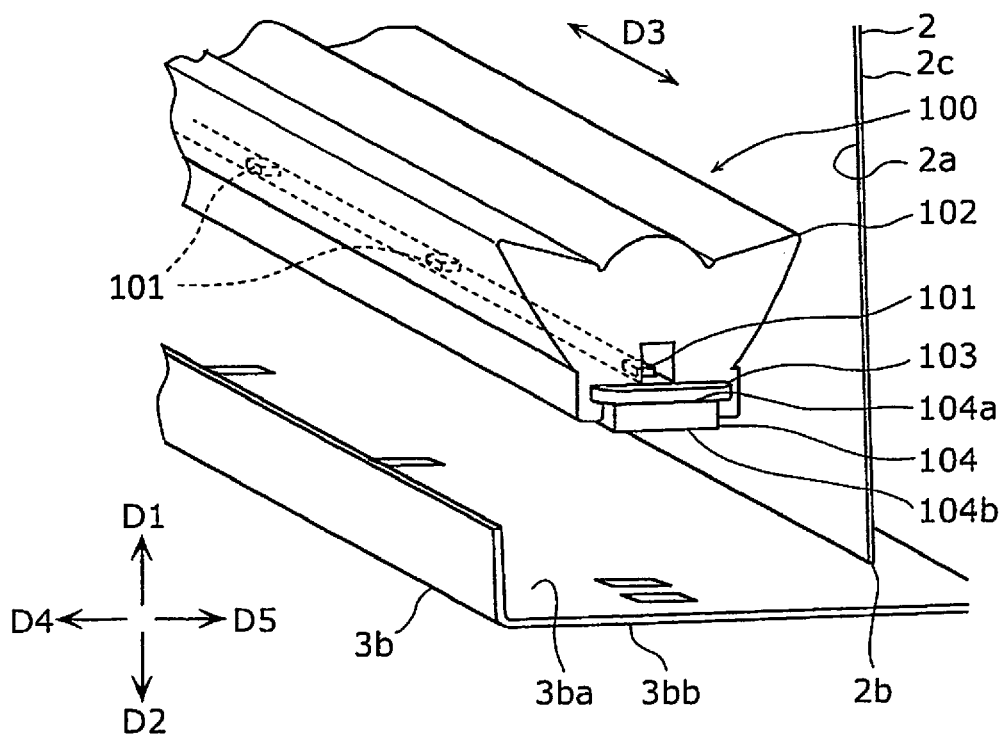
FIG. 4 is a simplified cross sectional perspective view in which the lighting device in FIG. 3 is enlarged.
Figure 5:
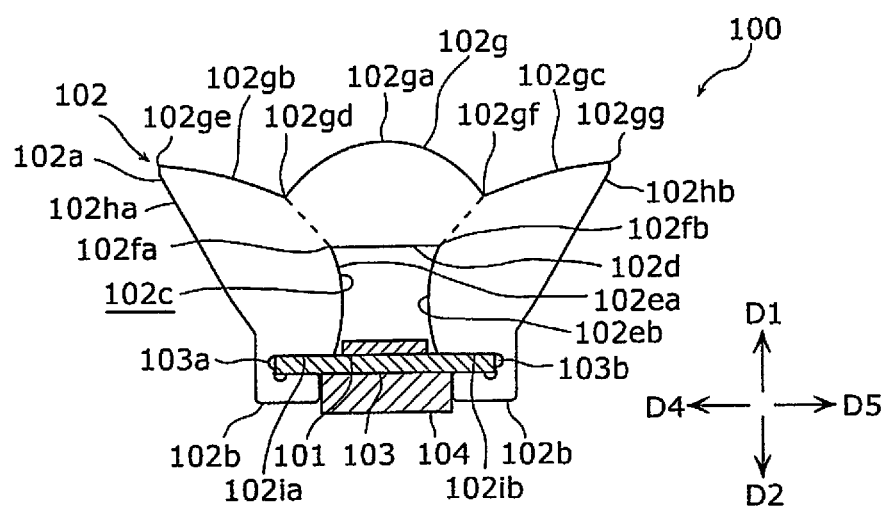
FIG. 5 is a simplified cross sectional side view of the lighting device in FIG. 3.

The detailed configuration of the lighting device 100 will be described. FIG. 4 is a simplified cross sectional perspective view in which the lighting device 100 in FIG. 3 is enlarged. FIG. 5 is a simplified cross sectional side view of the lighting device 100 in FIG. 3. In FIG. 4, the reflector sheet 5 and the light guide 10 are not depicted, and the rear housing 3b is partially cut out. The lighting device 100 has a slender columnar shape, extending along the edge 2b running in the lengthwise direction of the liquid crystal panel 2.

As shown in FIGS. 4 and 5, the lighting device 100 comprises a plurality of light sources 101 (e.g., at least one light source), a lens 102, a wiring board 103, and a support member 104. The wiring board 103 is in the form of a slender, rectangular plate, and is a board on which wiring and the like are provided for supplying electric power to the light sources 101. The wiring board 103 is a printed board, for example. In this embodiment, the wiring board 103 extends continuously over the entire lengthwise direction D3 of the lighting device 100, but can be divided up into a plurality of parts. The lengthwise direction of the wiring board 103 is the same as the lengthwise direction D3 of the lighting device 100.

The light sources 101 emit light when supplied with electric power. In this embodiment, the light sources 101 are LED elements, and emit diffused light. The light sources 101 are mounted on and supported by the wiring board 103. The light sources 101 are arranged spaced apart in the lengthwise direction D3 (e.g., the arrangement direction) of the wiring board 103. In this embodiment, the light sources 101 are arranged in a single row, but can be arranged in two or more rows.

The support member 104 is used to fix the wiring board 103 to the lower wall 3bb of the rear housing 3b. Like the wiring board 103, the support member 104 is in the form of a slender, rectangular plate. The wiring board 103 is disposed on one main face 104a of the two opposing, flat, rectangular main faces of the support member 104. The wiring board 103 is fixed to the support member 104 by a joining method such as adhesive bonding. The lengthwise direction of the wiring board 103 is the same as that of the support member 104, and the support member 104 extends along the lengthwise direction D3 of the wiring board 103. The light sources 101 are positioned on the opposite side from the support member 104 with respect to the wiring board 103. The other main face 104b of the support member 104 abuts against the lower wall 3bb. The support member 104 is fixed to the lower wall 3bb by a joining method such as screw fastening or adhesive bonding. In this embodiment, the support member 104 is fixed by screws that pass through the lower wall 3bb. The support member 104 extends continuously over the entire length direction D3 of the lighting device 100, but can be divided up into a plurality of parts.

The lens 102 directs the light emitted from the light source 101. The lens 102 as a whole is a columnar member extending along the lengthwise direction D3 of the wiring board 103, that is, along the direction in which the light sources 101 are arranged. The lens 102 is translucent and is a transparent or semi-transparent member. Examples of the constituent material of the lens 102 include glass and resins such as a polyamide resin or an acrylic resin. The lens 102 extends substantially over the entire length D3 of the wiring board 103. The lens 102 integrally has a columnar lens portion 102a and two legs 102b. The lengthwise direction of the lens 102 is the same as the lengthwise direction D3 of the wiring board 103.

The lens portion 102a and the two legs 102b form one continuous member. The lens portion 102a extends along the lengthwise direction D3 of the lens 102. The two legs 102b protrude in the downward direction D2 from the lens portion 102a, and extend while facing each other along the lengthwise direction D3 of the lens 102. The two legs 102b are bent in an L shape toward each other. The two edges 103a and 103b of the wiring board 103 are mated between the two legs 102b and the lens portion 102a. The edges 103a and 103b stick out laterally beyond the support member 104 and along the lengthwise direction D3 of the wiring board 103. The term "laterally" here is also the short-side direction of the rectangular main face 104a of the support member 104, as well as a direction perpendicular to the up and down directions D1 and D2. The lens 102 is able to slide in the lengthwise direction D3 (e.g., the slide direction) with respect to the wiring board 103. The configuration can be such that the support member 104 is mated between the two legs 102b and the lens portion 102a. Here, the wiring board 103 and the support member 104 are examples of a support.

A concave component 102c is formed in the lens portion 102a. The light sources 101 are located in the concave component 102c and emit light toward the inside of the concave component 102c. That is, light emitted from the light sources 101 is incident on the concave component 102c. The concave component 102c is recessed in the upward direction D1 from the light sources 101 and the wiring board 103, that is, away from the light sources 101, and opens toward the light sources 101 and the wiring board 103. The concave component 102c forms a groove extending along the lengthwise direction D3 of the lens 102.

Figure 6:
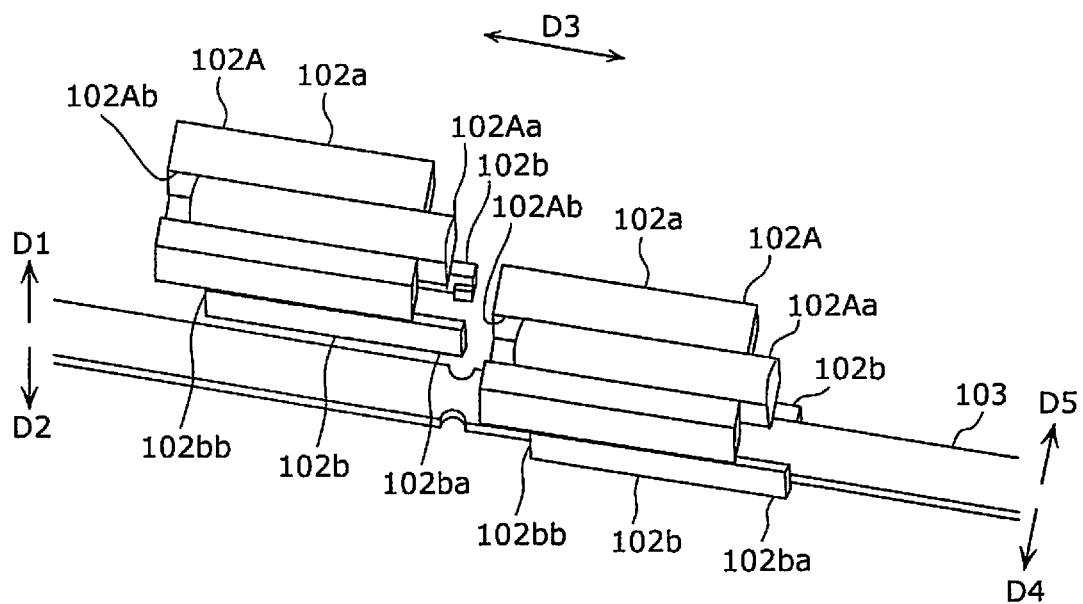
FIG. 6 is a simplified perspective view of part of lens bodies forming a lens in FIG. 4.

Further, as shown in FIG. 6, the lens 102 can be divided up in the lengthwise direction D3, that is, the direction in which the light sources 101 are arranged, and is formed by a plurality of lens bodies 102A. FIG. 6 is a simplified perspective view of some of the lens bodies 102A forming the lens 102 in FIG. 4. FIG. 6 shows two of the plurality of lens bodies 102A, in which one lens body 102A is attached to the wiring board 103 and the other lens body 102A is not attached to the wiring board 103. Each lens body 102A has a lens portion 102a and two legs 102b. Each lens body 102A is attached to the wiring board 103 slidably in the lengthwise direction D3.

Each lens body 102A integrally has a mating convex component 102Aa protruding toward the adjacent lens body 102A at one end in the lengthwise direction D3, which is the sliding direction. Further, each lens body 102A integrally has a mating concave component 102Ab recessed toward one end, that is, the mating convex component 102Aa, at the other end in the lengthwise direction D3. The mating concave component 102Ab has a shape that matches the mating convex component 102Aa. When the mating convex component 102Aa of the lens body 102A is mated with the mating concave component 102Ab of the adjacent lens body 102A, two adjacent lens bodies 102A are connected with each other at their ends. That is, the adjacent lens bodies 102A are linked by mating the mating convex component 102Aa and the mating concave component 102Ab.

Also, the legs 102b of each lens body 102A protrude from one end in the lengthwise direction D3 and are retracted from the other end in the lengthwise direction D3. When two adjacent lens bodies 102A are linked, the protruding portions 102ba of the legs 102b of one lens body 102A are mated with the retracted portions 102bb of the legs 102b of the other lens body 102A. That is, adjacent lens bodies 102A are linked by mating the protruding portions 102ba of the legs 102b with the retracted portions 102bb on the opposite side from the mating convex component 102Aa and the mating concave component 102Ab, with respect to the wiring board 103.

When the mating convex component 102Aa and the mating concave component 102Ab are mated, and the two legs 102b are mated, the two adjacent lens bodies 102A are securely fixed to each other in a state in which displacement with respect to each other is suppressed in the twist direction around the lengthwise direction D3 and the up and down directions D1 and D2. That is, the two adjacent lens bodies 102A are integrated. Furthermore, in the two adjacent lens bodies 102A, when the mating convex component 102Aa and the mating concave component 102Ab are mated, and the two legs 102b are mated, the lens portion 102a and the legs 102b hold the wiring board 103 in a state in which the wiring board 103 is pressed from both sides. At this point, the engagement convex component 102Aa and the engagement concave component 102Ab slide in the lengthwise direction D3 with respect to each other, such that the linked lens bodies 102A can slide with respect to each other and with respect to the wiring board 103. In FIG. 6, the protrusion direction of the legs 102b and the protrusion direction of the mating convex component 102Aa are the same, but they can be opposite.

1-3. Cross Sectional Shape of Lens

Next, the shape of a cross section of the lens 102 perpendicular to its axial direction will be described in detail. As shown in FIG. 5, the lens portion 102a of lens 102 has an outer face and an inner face that forms the concave component 102c. The inner face is made up of one inner bottom face 102d and two inner faces 102ea and 102eb. The inner bottom face 102d is opposite the light sources 101 and the wiring board 103 and is located in the upward direction D1 with respect to the wiring board 103. The inner bottom face 102d is a flat face extending along the lengthwise direction D3 of the lens 102. In this embodiment, the inner bottom face 102d is substantially parallel to the surface of the wiring board 103, but this is not the only option.

The inner faces 102ea and 102eb are respectively located in the side directions D4 and D5 with respect to the light sources 101, and are opposite each other with the light sources 101 in between. That is, the inner faces 102ea and 102eb are located on both sides of the light sources 101. The side directions D4 and D5 are perpendicular to the upward direction D1, the downward direction D2, and the lengthwise direction D3, and run along the surface of the wiring board 103. The inner faces 102ea and 102eb extend from the wiring board 103 in the upward direction D1, which is a direction crossing the surface of the wiring board 103, and extend along the lengthwise direction D3. The inner faces 102ea and 102eb each form a convex face that faces toward the inside of the concave component 102c. More specifically, they each form a curved face that protrudes in a convex shape in the side directions D5 and D4. In other words, the inner faces 102ea and 102eb form a curved face that protrudes in a convex shape toward the light sources 101. The inner faces 102ea and 102eb form curved lines, or more specifically arc-shaped lines, extending in the up and down directions D1 and D2 in a cross section perpendicular to the lengthwise direction D3. The lens portion 102a forms a convex lens on each of the inner faces 102ea and 102eb.

The boundary 102fa, which is the boundary line between the inner bottom face 102d and the inner face 102ea, is retracted in the side direction D4 relative to the protruding end, which is the portion that protrudes the most in the side direction D5 on the inner face 102ea. The boundary 102fb which is the boundary line between the inner bottom face 102d and the inner face 102eb, is retracted in the side direction D5 relative to the protruding end, which is the portion that protrudes the most in the side direction D4 on the inner face 102eb. The boundaries 102fa and 102fb are disposed at locations where diffused light emitted from the light sources 101 is not directly incident.

The outer face of the lens portion 102a is made up of one emission face 102g, two outer faces 102ha and 102hb, and two outer bottom faces 102ia and 102ib. The emission face 102g is located on the opposite side from the inner bottom face 102d of the concave component 102c in the lens portion 102a, that is, in the upward direction D1 of the inner bottom face 102d, and faces in the upward direction D1. The outer face 102ha is located in the side direction D4 with respect to the inner face 102ea of the concave component 102c, and faces in the side direction D4 with respect to the upward direction D1, which is the orientation direction of the emission face 102g. The outer face 102ha forms the outer face in the side direction D4 of the lens portion 102a. The outer face 102hb is located in the side direction D5 with respect to the inner face 102eb of the concave component 102c, and faces in the side direction D5 with respect to the orientation direction of the light emission face 102g. The outer face 102hb forms the outer face in the side direction D5 of the lens portion 102a.

The outer bottom faces 102ia and 102ib are flat faces that are located on the opposite side from the light emission face 102g and are adjacent to the concave component 102c. The outer bottom face 102ia is located between the concave component 102c and the outer face 102ha, and the outer bottom face 102ib is located between the concave component 102c and the outer face 102hb. When the lens 102 is attached to the wiring board 103, the outer bottom faces 102ia and 102ib abut the surface of the wiring board 103. The light sources 101 this a wiring board 103 are located at the open end of the concave component 102c or in the vicinity thereof.

The emission face 102g is made up of a central portion 102ga and side portions 102gb and 102gc on both sides of the central portion 102ga. The central portion 102ga extends along the lengthwise direction D3 of the lens 102 and forms a curved face that protrudes in a convex shape away from the inner bottom face 102d, that is, in the upward direction D1. The central portion 102ga forms a convex face that faces toward the outside of the lens 102. In a cross section perpendicular to the lengthwise direction D3, the central portion 102ga forms a curved line, or more specifically, an arc-shaped line, extending in the lateral directions D4 and D5. In the side directions D4 and D5, the width of the central portion 102ga is equal to or greater than the width of the inner bottom face 102d. This central portion 102ga is disposed such that the light that has been emitted from the light sources 101 and has entered the lens 102 through the inner bottom face 102d will be incident thereon.

The side portions 102gb and 102gc are each located in the side directions D4 and D5 with respect to the central portion 102ga, and extend along the lengthwise direction D3 of the lens 102. The side portions 102gb and 102gc form a curved face that protrudes in a convex shape in the upward direction D1, that is, they form a convex face that faces toward the outside of the lens 102. The side portions 102gb and 102gc form a curved line, or more specifically, an arc-shaped line, extending in the lateral directions D4 and D5 in a cross section perpendicular to the lengthwise direction D3. The side portions 102gb and 102gc are inclined as a whole with respect to the horizontal plane of the side directions D4 and D5, that is, with respect to the inner bottom face 102d and the surface of the wiring board 103. The side portion 102gb is inclined such that the boundary 102ge with the outer face 102ha is located farther in the upward direction D1 than the boundary 102gd with the central portion 102ga. The side portion 102gc is inclined such that the boundary 102gg with the outer face 102hb is located farther in the upward direction D1 than the boundary 102gf with the central portion 102ga. The side portions 102gb and 102gc are each inclined upward so as to increase the lens height toward the outside of the side directions D4 and D5. The lens height is the height of the lens 102 in the upward direction D1. In addition, the side portions 102gb and 102gc are inclined with respect to the center plane of the lens 102 so as to form a tapered face that diverges toward the upward direction D1, that is, in away from the light sources 101. In this embodiment, the side portions 102gb and 102gc are symmetrical with respect to the center plane of the lens 102, which is a vertical plane that passes through the center of the lens 102 in the side directions D4 and D5 and runs along the lengthwise direction D3, and are formed in the same size, shape, and slope. The lens portion 102a forms a convex lens in the central portion 102ga and in the side portions 102gb and 102gc.

The outer faces 102ha and 102hb are inclined with respect to the center plane of the lens 102 so as to form a fan-shaped, tapered face that widens the lens portion 102a in the upward direction D1, that is, in away from the light sources 101. The width of the lens portion 102a is the width in the side directions D4 and D5. The outer faces 102ha and 102hb are inclined in a tapered shape such that the lens 102 diverges toward the emission face 102g. The outer faces 102ha and 102hb are inclined with respect to the inner faces 102ea and 102eb of the concave component 102c, respectively. The outer faces 102ha and 102hb each form a curved face that extends along the lengthwise direction D3 of the lens 102 and protrudes in a convex shape in the side directions D4 and D5. The outer faces 102ha and 102hb form convex faces that face toward the outside of the lens 102. The outer faces 102ha and 102hb form a curved line, or more specifically, an arc-shaped line, extending in the up and down directions D1 and D2 in a cross section perpendicular to the lengthwise direction D3. In this embodiment, the outer faces 102ha and 102hb are symmetrical with respect to the center plane of the lens 102, and are formed in the same size, shape, and inclination. The lens portion 102a forms a convex lens at each of the outer faces 102ha and 102hb.

The lens 102 described above has a shape that is symmetrical with respect to the center plane of the lens 102. In the illustrated embodiment, as illustrated in FIG. 5, the convex face of the central portion 102ga has a different curvature from the convex faces of the side portions 102gb and 102gc and the inner bottom face 102d. Specifically, the convex face of the central portion 102ga has a larger curvature than the convex faces of the side portions 102gb and 102gc and the inner bottom face 102d. Also, in the illustrated embodiment, the convex faces of the inner faces 102ea and 102eb have a larger curvature than the convex faces of the outer faces 102ha and 102hb. Also, in the illustrated embodiment, the convex faces of the side portions 102gb and 102gc have a larger curvature than the convex faces of the outer faces 102ha and 102hb.

1-4. Emitted Light Emitted by Lighting Device

Figure 7:
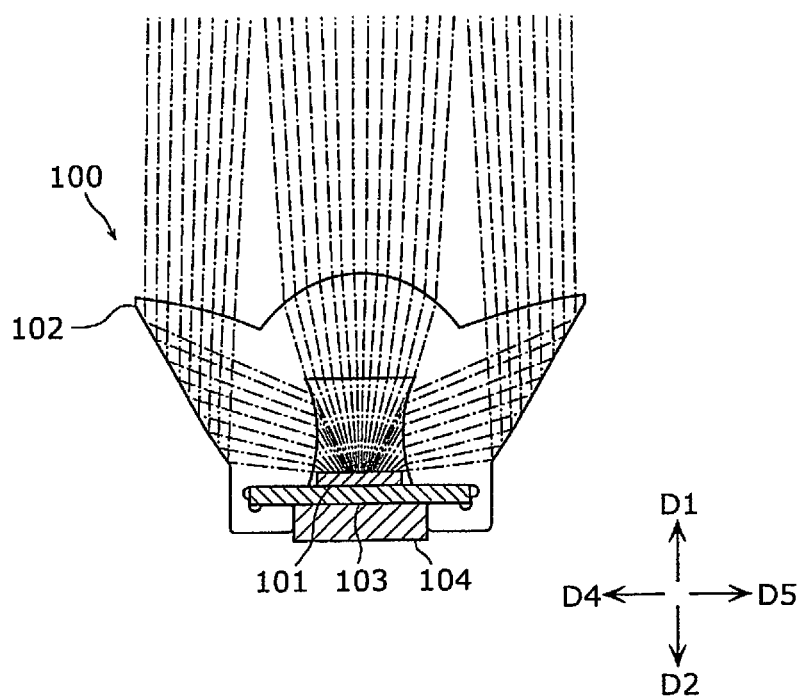
FIG. 7 is a simplified cross sectional side view of light emitted by the lighting device in FIG. 5.

The emitted light emitted by the lighting device 100 will now be described through reference to FIGS. 5 and 7. FIG. 7 is a simplified cross sectional side view of the light emitted by the lighting device 100 in FIG. 5. In FIG. 7, the one-dot chain lines are imaginary lines showing a simplified view of the optical paths of the light emitted from the light sources 101. The light emitted from the light sources 101 in the upward direction D1 is diffused and enters the lens 102 from the inner bottom face 102d and the inner faces 102ea and 102eb of the concave component 102c. The inner bottom face 102d and the inner faces 102ea and 102eb here are oriented so as to function as refracting faces for the light emitted from the light sources 101.

The light that has entered from the inner bottom face 102d advances to the emission face 102g. At this point, the light is refracted at the flat inner bottom face 102d and is efficiently incident over a wide region of the central portion 102ga, which is wider than the inner bottom face 102d. The central portion 102ga is oriented so as to function as a refracting face for the light that has entered from the inner bottom face 102d. Therefore, the light is refracted at the central portion 102ga and emitted in the upward direction D1 to the outside of the lens 102. At this point, the light is refracted at the curved central portion 102ga so as to reduce its spreading in the lateral directions D4 and D5, forming substantially parallel light whose spread is suppressed outside the lens 102.

The light that has entered from the inner face 102ea advances to the outer face 102ha. At this point, the light is refracted at the curved inner face 102ea so as to reduce its spreading in the up and down directions D1 and D2, and the light is efficiently incident on the wide region of the outer face 102ha while its leakage to the outside of the outer face 102ha is suppressed. The outer face 102ha is inclined so as to increase the incident angle of light from the inner face 102ea to the outer face 102ha, and is configured to reflect the light that has entered through the inner face 102ea toward the emission face 102g. More specifically, the outer face 102ha is inclined so as to function as a reflecting face that reflects the light that has entered from the inner face 102ea at high reflectance, such as total reflection. Therefore, the light is reflected by the outer face 102ha and proceeds to the side portion 102gb. At this point, the light is reflected at the inclined outer face 102ha so as to be directed toward the side portion 102gb, and furthermore the light is reflected at the curved outer face 102ha so as to reduce its spreading in the side directions D4 and D5. This reflected light is efficiently incident on a wide area of the side portion 102gb while its leakage to the outside of the side portion 102gb is suppressed.

The side portion 102gb is inclined so as to function as a refracting face for the light incident from the outer face 102ha. Therefore, the light incident on the side portion 102gb is refracted by the side portion 102gb and emitted to the outside of the lens 102 in the upward direction D1. At this point, the light is refracted at the inclined side portion 102gb so as to be directed in the upward direction D1, and is refracted at the curved side portion 102gb so as to increase its spreading in the side directions D4 and D5, so as to form parallel light. This side portion 102gb refracts the light reflected by the outer face 102ha substantially in the same direction as the light emitted from the central portion 102ga. The light then forms substantially parallel light whose spread is suppressed outside the lens 102.

In addition, the light that has entered from the inner face 102eb behaves the same as the light that has entered from the inner face 102ea. The inner face 102eb functions as a refracting face, the outer face 102hb functions as a reflecting face, and the side portion 102gc functions as a refracting face. The light that has entered from the inner face 102eb is refracted so as to reduce its spreading at the inner face 102eb, is reflected at the outer face 102hb so as to reduce its spreading and to direct it toward the side portion 102gc, is refracted at the side portion 102gc so as to increase its spreading and to direct it in the upward direction D1, and is emitted to the outside of the lens 102.

The light emitted from each of the central portion 102ga, the side portion 102gb, and the side portion 102gc forms substantially parallel light in which spreading in the side directions D4 and D5 is suppressed and which is directed in the upward direction D1. Furthermore, the central portion 102ga, the side portion 102gb, and the side portion 102gc form emitted light with suppressed mutual interference. Thus, the lens 102 separately emits the light that has entered the lens 102 from the light sources 101 from the central portion 102ga, the side portion 102gb, and the side portion 102gc.

Here, when the light is incident at the boundary 102gd between the central portion 102ga and the side portion 102gb, or at the boundary 102gf between the central portion 102ga and the side portion 102gc, the incident light can be refracted in a random direction different from that of the light incident on the central portion 102ga and the side portions 102gb and 102gc. This can cause interference with the light emitted from the lens 102. However, the boundary 102gd or 102gf is disposed in a region of the emission face 102g where the light density is low. Interference is therefore suppressed.

In the concave component 102c, when the light emitted from the light sources 101 is directly incident on the boundaries 102fa and 102fb, the light can be refracted in a random direction different from that of the light that has entered from the inner bottom face 102d and the inner faces 102ea and 102eb. Consequently, interference can be caused by the intersection of light inside the lens 102, which can result in the amplification or attenuation of the light. However, the light emitted from the light sources 101 is not directly incident on the boundaries 102fa and 102fb. Furthermore, the light that has entered from the inner bottom face 102d, the light that has entered from the inner face 102ea, and the light that has entered from the inner face 102eb do not intersect each other in the interior of the lens 102. Therefore, the light emitted from the central portion 102ga, the side portion 102gb, and the side portion 102gc form the emitted light in which there is less bias in the brightness distribution of the light.

Figure 8:
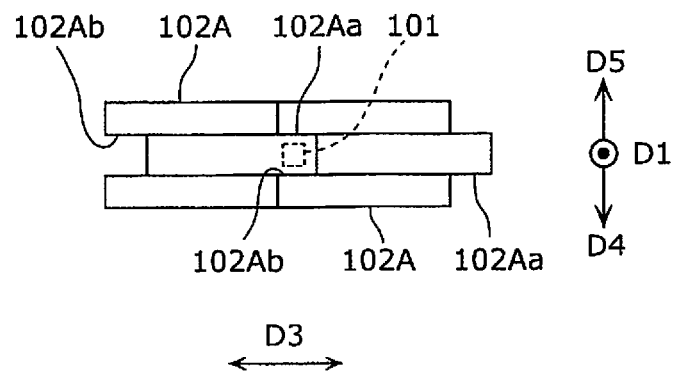
FIG. 8 is a simplified plan view of two mutually linked lens bodies in FIG. 6, as viewed downwardly from the top.

Also, the mating convex component 102Aa of the lens body 102A shown in FIG. 6 has the same width as the central portion 102ga in the side directions D4 and D5. That is, the positions of the two side faces of the mating convex component 102Aa in the side directions D4 and D5 coincide with the positions of the boundaries 102gd and 102gf, which are the two ends of the central portion 102ga in the side directions D4 and D5. For example, the side faces of the mating convex component 102Aa extend along the broken line passing through the boundaries 102gd and 102gf in FIG. 5. The side face of the mating convex component 102Aa forms the boundary between the mating convex component 102Aa and the mating concave component 102Ab. Therefore, as shown in FIG. 8, for example, even when the light sources 101 are located under the mating convex components 102Aa of adjacent lens bodies 102A, light that leaks from the gap between the mating convex component 102Aa and the mating concave component 102Ab is less likely to interfere with the light that has entered the lens 102 from the inner bottom face 102d and the inner faces 102ea and 102eb. That is, the light leaking through the gap between the mating convex component 102Aa and the mating concave component 102Ab is less likely to interfere with the light emitted from the central portion 102ga, and also less likely to interfere with the light emitted from the side portions 102gb and 102gc. FIG. 8 is a simplified plan view of the two lens bodies 102A linked together in FIG. 6, as viewed downwardly from the top.

Figure 9:
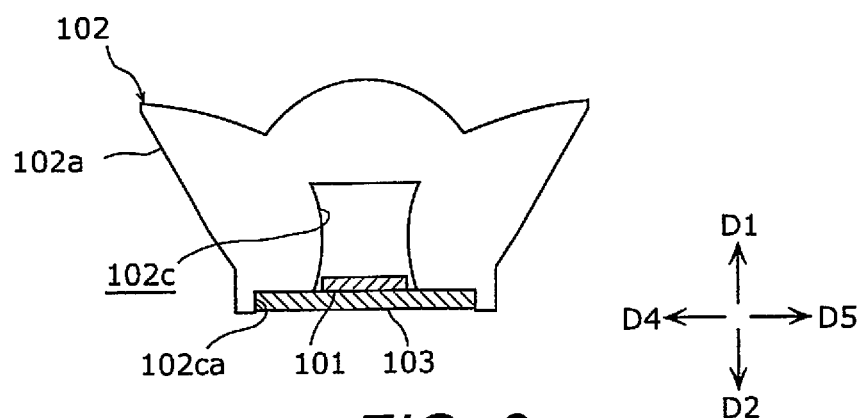
FIG. 9 is a simplified cross sectional side view of a modification example of the lens of the lighting device according to the first embodiment, illustrating the modification example in the same view as FIG. 5.

Also, as shown in FIG. 9, the lens 102 can be configured not to comprise the legs 102b, and to comprise only the lens portion 102a. In this case, the concave component 102c can include a widened portion 102ca that is widened such that the wiring board 103 will fit at the open end. FIG. 9 is a simplified cross sectional side view showing a modification example of the lens 102 of the lighting device 100 according to the first embodiment, illustrating the lighting device in the same view as FIG. 5.

In this embodiment, the inner faces 102ea and 102eb each form a convex curved face that protrudes toward the inside of the lens 102 (i.e., toward the vertical center line of the lens 102 that extends along the upward and downward directions D1 and D2). However, this is not the only option, and they can instead form a convex bent face that protrudes toward the inside of the lens 102. Also, the inner bottom face 102d forms a flat face. However, this is not the only option, and it can instead form a convex curved face or bent face that protrudes toward the outside of the lens 102 (i.e., upward in the upward direction D1), or can form a concave curved face or bent face that is recessed toward the inside (i.e., downward in the downward direction D2). The outer faces 102ha and 102hb, the central portion 102ga, and the side portions 102gb and 102gc each form a convex curved face that protrudes outward (i.e., away from the vertical center line of the lens 102 or upward in the upward direction DD. However, this is not the only option, and they can instead form a convex bent face that protrudes outward, or can form a flat face. The above-mentioned bent face and curved face form a bent line and a curved line in a cross section perpendicular to the lengthwise direction D3 of the lens 102 (i.e., in the same view as FIG. 5).

1-5. Effect

As described above, in the lighting device 100 according to the first embodiment, the lens 102 has the concave component 102c, the emission face 102g and the outer faces 102ha and 102hb. The light emitted from the light sources 101 is incident on the concave component 102c. The emission face 102g is located on the opposite side from the concave component 102c. The outer faces 102ha and 102hb are located to the side of the concave component 102c. The inner faces 102ea and 102eb of the concave component 102c form a convex face that faces toward the inside of the concave component 102c. The outer faces 102ha and 102hb are each configured to reflect the light that has entered the lens 102 through the inner faces 102ea and 102eb toward the emission face 102g. With this configuration, the light emitted from the light sources 101 enters the lens 102 from the inner bottom face 102d and the inner faces 102ea and 102eb. The light that has entered from the inner bottom face 102d travels through the lens 102 and is emitted from the emission face 102g to the outside of the lens 102. The light that has entered from the inner faces 102ea and 102eb travels through the lens 102, is reflected by the outer faces 102ha and 102hb, and is emitted from the emission face 102g to the outside of the lens 102. The light that has entered from the inner faces 102ea and 102eb is directed in a state in which it is prevented from spreading out by the inner faces 102ea and 102eb forming the convex face. Thus, it is efficiently incident on the outer faces 102ha and 102hb. Consequently, the light that has entered from the inner bottom face 102d and the light that has entered from the inner faces 102ea and 102eb are emitted from the emission face 102g in a state in which the optical path is controlled in the lens 102. This allows the lighting device 100 to control light inside the lens 102.

In the lens 102 of the lighting device 100 according to the first embodiment, the boundaries 102fa and 102fb between the inner bottom face 102d of the concave component 102c and the inner faces 102ea and 102eb are retracted relative to the protruding ends of the inner faces 102ea and 102eb such that the light incident on the concave component 102c from the light sources 101 is not directly incident on the boundaries 102fa and 102fb. The travel direction of the light that has entered from the boundaries 102fa and 102fb is difficult to control in the lens 102, and can travel in a random direction different from that of the light that has entered from the inner bottom face 102*d* and the light that has entered from the inner faces 102*ea* and 102*eb*, which can cause various kinds of interference with the light that has entered from these faces 102*d*, 102*ea* and 102*eb*. With this lighting device 100, the light in the lens 102 can be controlled by suppressing the incidence of the light at the boundaries 102*fa* and 102*fb*.

In the lens 102 of the lighting device 100 according to the first embodiment, the emission face 102*g* has the central portion 102*ga* and the side portions 102*gb* and 102*gc*. The central portion 102*ga* is arranged such that the light that has entered the lens 102 through the inner bottom face 102*d* is incident on the central portion 102*ga*. The side portions 102*gb* and 102*gc* are located to the side of the central portion 102*ga*. The outer faces 102*ha* and 102*hb* are each oriented such that the light that has entered the lens 102 through the inner faces 102*ea* and 102*eb* is reflected toward the side portions 102*gb* and 102*gc*. With the above configuration, the light that has entered the lens 102 from the inner bottom face 102*d* and the inner faces 102*ea* and 102*eb* is emitted from the central portion 102*ga* and the side portions 102*gb* and 102*gc*, which are different regions of the emission face 102*g*, respectively. This suppresses interference between the light that has entered from the inner bottom face 102*d* and the light that has entered from the inner faces 102*ea* and 102*eb* in the lens 102.

Also, in the lens 102 of the lighting device 100 according to the first embodiment, the side portions 102*gb* and 102*gc* of the emission face 102*g* are each oriented such that the light reflected by the outer faces 102*ha* and 102*hb* is refracted substantially in the same direction as the light emitted from the central portion 102*ga*. With the above configuration, interference of the light emitted from the central portion 102*ga* and the side portions 102*gb* and 102*gc* to the outside of the lens 102 is suppressed.

Also, in the lens 102 of the lighting device 100 according to the first embodiment, the outer faces 102*ha* and 102*hb* are inclined in a tapered shape such that the lens 102 diverges toward the emission face 102*g*. Furthermore, the outer faces 102*ha* and 102*hb* form convex faces that face toward the outside of the lens 102. With the above configuration, the outer faces 102*ha* and 102*hb* that form convex faces and are inclined can direct the reflected light while suppressing its spreading, and can be incident in the desired region of the emission face 102*g*. This makes it possible to control the light reflected by the outer faces 102*ha* and 102*hb*.

Also, in the lighting device 100 according to the first embodiment, the lens 102 is a columnar member that extends in the arrangement direction of the light sources 101 and is dividable into the plurality of the lens bodies 102A in the arrangement direction. The lens bodies 102A are slidably attachable to the wiring board 103, which serves as a support. With the above configuration, distortion of the lens 102 caused by thermal expansion and contraction can be suppressed by making up the lens 102 with the plurality of the lens bodies 102A. Furthermore, since the lens bodies 102A are slidable with respect to the wiring board 103, even if a lens body 102A expands or contracts due to heat, stress exerted on an adjacent lens body 102A can be suppressed.

Also, in the lighting device 100 according to the first embodiment, the lens bodies 102A are linked together by mating the mating convex component 102Aa that protrudes from one end in the slide direction with the mating concave component 102Ab that is recessed from the other end in the slide direction. Furthermore, the emission faces 102*g* of the lens bodies 102A each have the central portion 102*ga* and the side portions 102*gb* and 102*gc* located to the side of the central portion 102*ga*, and the lens bodies 102A separately emit the light that has entered the lens bodies 102A from the central portion 102*ga* and the side portions 102*gb* and 102*gc*. The boundary between the mating convex component 102Aa and the mating concave component 102Ab is located at the boundaries 102*gd* and 102*gf* between the central portion 102*ga* and the side portions 102*gb* and 102*gc*. With the above configuration, adjacent lens bodies 102A are linked in the sliding direction. The linked lens bodies 102A are slidable with respect to the wiring board 103 and an adjacent lens bodies 102A by sliding the mating convex component 102Aa and the mating concave component 102Ab with respect to each other. Also, the light incident on the boundary between the mating convex component 102Aa and the mating concave component 102Ab can be emitted from the boundaries 102*gd* and 102*gf*. Therefore, the light incident on the boundary between the mating convex component 102Aa and the mating concave component 102Ab is less likely to interfere with the light emitted from the central portion 102*ga*, and less likely to interfere with the light emitted from the side portions 102*gb* and 102*gc*.

Also, in the lighting device 100 according to the first embodiment, the lens bodies 102A have the legs 102*b* that hold the lens body 102A on the wiring board 103, respectively. The legs 102*b* each have the protruding portion 102*ba* that protrudes from one end of the lens body 102A in the slide direction, and the retracted portion 102*bb* that is retracted from the other end in the slide direction. Adjacent lens bodies 102A are linked together by mating the protruding portions 102*ba* with the retracted portions 102*bb* on the opposite side of the mating convex component 102Aa and the mating concave component 102Ab with respect to the wiring board 103. With the above configuration, the lens bodies 102A are mated to the wiring board 103 such that the wiring board 103 is sandwiched from both sides, by the action of mating of the mating convex component 102Aa with the mating concave component 102Ab and the mating of the legs 102*b*. This makes it possible to securely link the lens bodies 102A, and securely hold the lens bodies 102A to the wiring board 103.

The display device 1 according to an embodiment comprises the liquid crystal panel 2 (e.g., the display panel) and the lighting device 100. The liquid crystal panel 2 is configured to display an image on the display face of the front face 2*c*. The lighting device is disposed on the back face side of the liquid crystal panel 2 that is an opposite side from the display face side, and is configured to illuminate the back face 2*a* of the liquid crystal panel 2. With the above configuration, the display device 1 can achieve the same effect as the lighting device 100 according to the first embodiment.

Second Embodiment

A lighting device 200 according to a second embodiment will be described. The lighting device 200 according to the second embodiment differs from the first embodiment in the cross sectional shape of the lens. In this embodiment, those components that are the same as in the first embodiment will be numbered the same, and will not be described again. The following description will focus on the differences from the first embodiment, and things that are the same as in the first embodiment will not be described again.

2-1. Configuration of Lens

Figure 10:
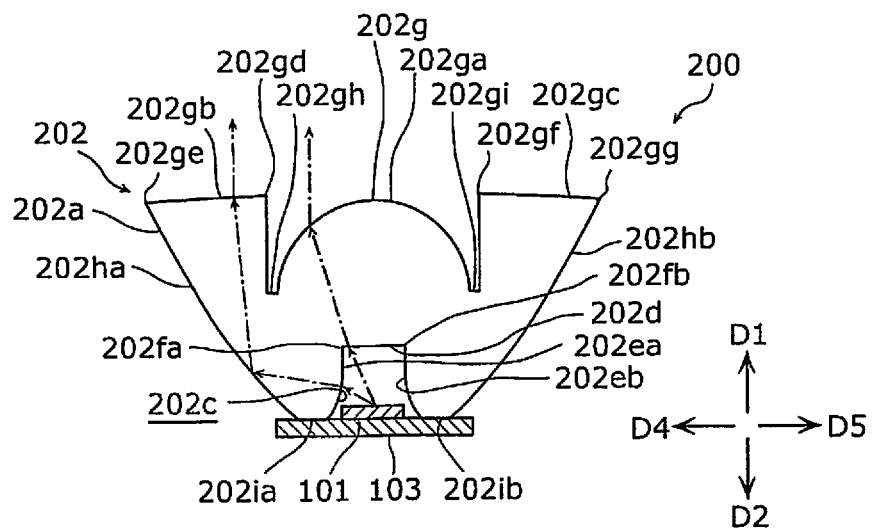
FIG. 10 is a simplified cross sectional side view of a lighting device according to a second embodiment, illustrating the lighting device in the same view as FIG. 5.

With reference to FIG. 10, the configuration of a lens 202 of the lighting device 200 according to the second embodiment will be described by looking at the shape of a cross section perpendicular to the axial direction thereof. FIG. 10 is a simplified cross sectional side view of the lighting device 200 according to the second embodiment, illustrating the lighting device 200 in the same view as FIG. 5. As shown in FIG. 10, the lens 202 of the lighting device 200 comprises a lens portion 202a, but no legs.

Like the lens 102 of the first embodiment, the lens 202 has a concave component 202c in which the light sources 101 is disposed. Just as with the concave component 102c, the inner face forming the concave component 202c is formed by the inner bottom face 202d and the inner faces 202ea and 202eb. The inner bottom face 202d is a flat surface like the inner bottom face 102d. The inner faces 202ea and 202eb each form a convex face that faces toward the inside of the concave component 202c, like the inner faces 102ea and 102eb. Further, the inner faces 202ea and 202eb are inclined in a tapered shape so as to form the concave component 202c in a shape that diverges away from the inner bottom face 202d, that is, toward the light sources 101. The lens 202 forms a convex lens at each of the inner faces 202ea and 202eb. The inner faces 202ea and 202eb, which are inclined in a tapered shape so as to cover the light sources 101, increase the efficiency at which the light from the light sources 101 is incident.

The boundary 202fa between the inner bottom face 202d and the inner face 202ea and the boundary 202fb between the inner bottom face 202d and the inner face 202eb are positioned in the directions D4 and D5 such that the diffused light emitted from the light sources 101 into the concave component 202c will not be directly incident.

The outer face of the lens 202 is formed by an emission face 202g, outer faces 202ha and 202hb, and outer bottom faces 202ia and 202ib. The outer faces 202ha and 202hb are located in the side directions D4 and D5 with respect to the concave part 202c, like the outer faces 102ha and 102hb, and are inclined so as to form a tapered face that diverges and widens the lens 202 in the upward direction D1. The outer faces 202ha and 202hb each form curved faces that protrude in a convex shape in the side directions D4 and D5. In this embodiment, the outer faces 202ha and 202hb are symmetrical with respect to the center plane of the lens 202, and are formed in the same size, shape, and inclination.

The outer bottom face 202ia is a flat face that is located between the concave component 202c and the outer face 202ha and abuts against the surface of the wiring board 103. The outer bottom face 202ib is a flat face that is located between the concave component 202c and the outer face 202hb and abuts against the surface of the wiring board 103. The light sources 101 are located at or near the opening end of the concave component 202c.

The emission face 202g is formed by a central portion 202ga and side portions 202gb and 202gc. Like the central portion 101ga, the central portion 202ga forms a curved face that protrudes in a convex shape in the upward direction D1. In the side directions D4 and D5, the width of the central portion 202ga is equal to or greater than the width of the inner bottom face 202d. The central portion 202ga is disposed such that the light that has been emitted from the light sources 101 and that has entered the lens 202 through the inner bottom face 202d will be incident thereon.

The side portions 202gb and 202gc are located in the side directions D4 and D5 with respect to the central portion 202ga, respectively, and form a flat face. The side portion 202gb is inclined such that the boundary 202ge with the outer face 202ha is located farther in the downward direction D2 than the boundary 202gd with the central portion 202ga. The side portion 202gc is inclined such that the boundary 202gg with the outer face 202hb is located farther in the downward direction D2 than the boundary 202gf with the central portion 202ga. The side portions 202gb and 202gc are inclined downward so as to reduce the lens height toward the outside in the side directions D4 and D5, respectively. In this embodiment, the side portions 202gb and 202gc are symmetrical with respect to the center plane of the lens 202, and are formed in the same size, shape, and inclination.

In the boundaries 202gd and 202gf, grooves 202gh and 202gi are respectively formed so as to be recessed toward the inside of the lens 202, and more specifically, in the downward direction D2. The grooves 202gh and 202gi extend in the lengthwise direction D3 of the lens 202. The groove 202gh forms a step between the side portion 202gb and the central portion 202ga such that the end of the central portion 202ga is retracted in the downward direction D2 more than the side portion 202gb. The groove 202gi forms a step between the side portion 202gc and the central portion 202ga such that the end of the central portion 202ga is retracted in the downward direction D2 more than the side portion 202gc.

In the lens 202 as described above, the height of the central portion 202ga in the upward direction D1 with respect to the side portions 202gb and 202gc is kept lower than the height of the central portion 102ga with respect to the side portions 102gb and 102gc in the first embodiment. Furthermore, the lens 202 has a symmetrical shape with respect to the center plane of the lens 202. In the illustrated embodiment, as illustrated in FIG. 10, the convex face of the central portion 202ga has a different curvature from the surfaces of the side portions 202gb and 202gc and the inner bottom face 202d. Specifically, the convex face of the central portion 202ga has a larger curvature than the surfaces of the side portions 202gb and 202gc and the inner bottom face 202d. Also, in the illustrated embodiment, the convex faces of the inner faces 202ea and 202eb at the lower section have a larger curvature than the surfaces of the outer faces 202ha and 102hb.

2-2. Emitted Light Emitted by Lighting Device

Figure 11:
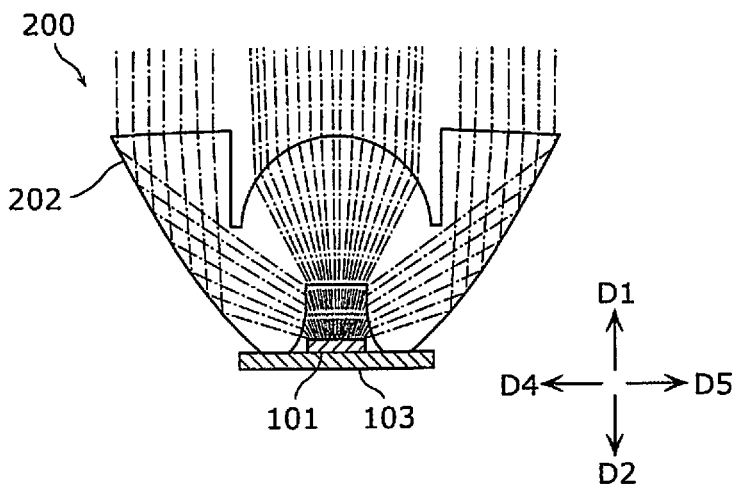
FIG. 11 is a simplified cross sectional side view of light emitted by the lighting device in FIG. 10.

The emitted light emitted by the lighting device 200 will now be described through reference to FIGS. 10 and 11. FIG. 11 is a simplified cross sectional side view of the light emitted by the lighting device 200 in FIG. 10. The diffused light emitted from the light sources 101 in the upward direction D1 enters the lens 202 from the inner bottom face 202d and the inner faces 202ea and 202eb as indicated by the one-dot chain line. The inner bottom face 202d and the inner faces 202ea and 202eb each function as a refracting face for the light emitted from the light sources 101.

The light that has entered from the inner bottom face 202d travels to the central portion 202ga of the emission face 202g. The light is refracted at the inner bottom face 202d and is efficiently incident over a wide area of the central portion 202ga. The central portion 202ga functions as a refracting face for the light that has entered from the inner bottom face 202d. The light is refracted at the central portion 202ga so as to reduce its spreading in the side directions D4 and D5, and is emitted as substantially parallel light to the outside of the lens 202 in the upward direction D1.

The light that has entered from the inner face 202ea travels to the outer face 202ha. The light is refracted at the curved and inclined inner face 202ea, and is directed so as to be confined to be incident on the outer face 202*ha* by reducing its spreading in the up and down directions D1 and D2. The outer face 202*ha* reflects the light that has entered through the inner face 202*ea* toward the side portion 202*gb* while reducing its spreading in the side directions D4 and D5. The inner face 202*ea* orients the light to a region further in the upward direction D1 than in the first embodiment on the outer face 202*ha*, and the outer face 202*ha* is inclined so as to direct this light to the side portion 202*gb*.

The side portion 202*gb* functions as a refracting face for the light incident from the outer face 202*ha*. Since the side portion 202*gb* is inclined in the downward direction D2 toward the outside in the side direction D4, the light incident on the side portion 202*gb* is refracted in the upward direction D1, and is emitted as substantially parallel light to the outside of the lens 202.

The light that has entered from the inner face 202*eb* behaves similarly to the light that has entered from the inner face 202*ea*. At the side portion 202*gc*, substantially parallel light is emitted in the upward direction D1. The gaps formed by the grooves 202*gh* and 202*gi* make it less likely that the light emitted from the central portion 202*ga*, the light emitted from the side portion 202*gb*, or the light emitted from the side portion 202*gc* will again enter the lens 202 from the stepped part (e.g., the step) between the side portion 202*gb* and the central portion 202*ga*, or from the stepped part (e.g., the step) between the side portion 202*gc* and the central portion 202*ga*.

The light emitted from the central portion 202*ga*, the side portion 202*gb*, and the side portion 202*gc* forms substantially parallel emitted light that is oriented in the upward direction D1 and whose spreading in the side directions D4 and D5 is suppressed. Furthermore, the central portion 202*ga*, the side portion 202*gb*, and the side portion 202*gc* emit the emitted light in which mutual interference is suppressed.

In this embodiment, the inner faces 202*ea* and 202*eb* each form a convex curved face that protrudes toward the inside of the lens 202 (i.e., toward the vertical center line of the lens 202 that extends along the upward and downward directions D1 and D2). However, this is not the only option, and they can instead form a convex bent face that protrudes toward the inside of the lens 202. Also, the inner bottom face 202*d* forms a flat face. However, this is not the only option, and it can instead form a convex curved face or bent face that protrudes toward the outside of the lens 202 (i.e., upward in the upward direction D1), or can form a curved face or bent face that is recessed toward the inside (i.e., downward in the downward direction D2). The outer faces 202*ha* and 202*hb* and the central portion 202*ga* each form a convex curved face that protrudes toward the outside of the lens 202 (i.e., away from the vertical center line of the lens 202 or upward in the upward direction D1). However, this is not the only option, and they can instead form a convex bent shape that protrudes toward the outside, or can form a flat face. The side portions 202*gb* and 202*gc* each form a flat surface. However, this is not the only option, and they can instead form a convex curved face or bent face that protrudes toward the outside of the lens 202 (i.e., upward in the upward direction D1). The above-mentioned bent face and curved face form a bent line and a curved line in a cross section perpendicular to the lengthwise direction D3 of the lens 202 (i.e., in the same view as FIG. 10).

2-3. Effect

As described above, the lighting device 200 of the second embodiment has the same effect as that of the lighting device 100 according to the first embodiment. Furthermore, in the lens 202 of the lighting device 200 according to the second embodiment, the inner faces 202*ea* and 202*eb* of the concave component 202*c* are inclined in a tapered shape such that the concave component 202*c* diverges away from the inner bottom face 202*d*. With the above configuration, it is possible to control the travel direction of the light that has entered from the inner faces 202*ea* and 202*eb* in the lens 202. Consequently, the light that has entered from the inner faces 202*ea* and 202*eb* can be confined to be incident on the outer faces 202*ha* and 202*hb*, respectively.

Also, in the lens 202 of the lighting device 200 according to the second embodiment, the emission face 202*g* has the grooves 202*gh* and 202*gi*. The grooves 202*gh* and 202*gi* are disposed between the central portion 202*ga* and the side portion 202*gb* or 202*gc*, respectively, and form the stepped parts between the central portion 202*ga* and the side portion 202*gb* or 202*gc*, respectively. With the above configuration, the grooves 202*gh* and 202*gi* suppress the light emitted from the central portion 202*ga*, or the light emitted from the side portions 202*gb* and 202*gc* from entering the lens 202 again. Consequently, interference of the light within the lens 202 is suppressed. Also, the central portion 202*ga* and the side portions 202*gb* and 202*gc* are stepped. Thus, the central portion 202*ga* can be made lower in the downward direction D2 than the side portions 202*gb* and 202*gc*, for example. This can make the lens 202 smaller in the height direction (e.g., in the upward direction D1).

Third Embodiment

A lighting device 300 according to a third embodiment will be described. With the lighting device 300 according to the third embodiment, the cross sectional shape of the lens is different from that in the first embodiment. In this embodiment, those constituent elements that are the same as in the first or second embodiment will be numbered the same, and will not be described again. The following description will focus on the differences from the first and second embodiments, and things that are the same as in the first or second embodiment will not be described again.

3-1. Configuration of Lens

Figure 12:
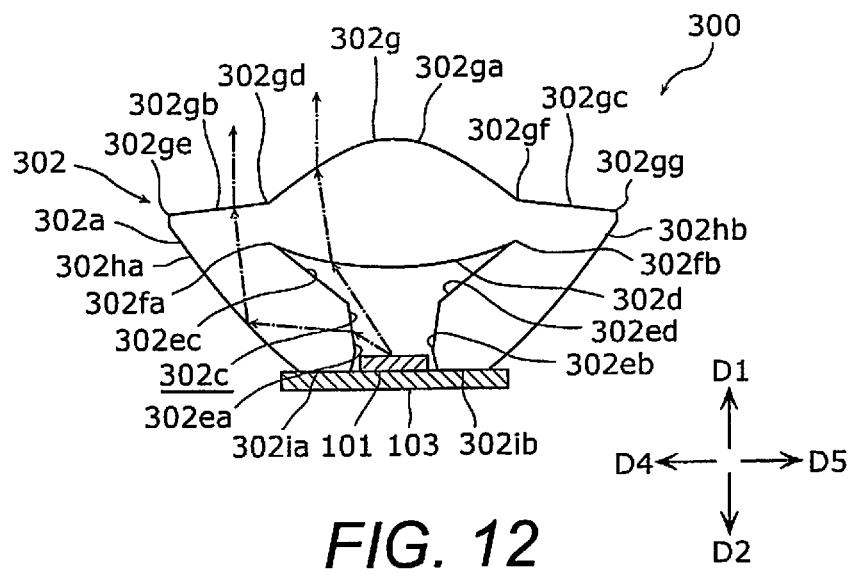
FIG. 12 is a simplified cross sectional side view of a lighting device according to a third embodiment, illustrating the lighting device in the same view as FIG. 5.

With reference to FIG. 12, the configuration of the lens 302 of the lighting device 300 according to the third embodiment will be described by looking at the shape of a cross section perpendicular to the axial direction thereof. FIG. 12 is a simplified cross sectional side view of the lighting device 300 according to the third embodiment, illustrating the lighting device 300 in the same view as FIG. 5. As shown in FIG. 12, the lens 302 of the lighting device 300 comprises a lens portion 302*a*, but no legs.

Like the lens 102 of the first embodiment, the lens 302 has a concave component 302*c* in which the light sources 101 are disposed. The inner faces forming the concave component 302*c* are formed by an inner bottom face 302*d*, convex faces 302*ea* and 302*eb*, and widened faces 302*ec* and 302*ed*. The convex faces 302*ea* and 302*eb* and the widened faces 302*ec* and 302*ed* form the inner faces of the concave component 302*c*. The inner bottom face 302*d* forms a convex curved face that protrudes toward the inside of the concave component 302*c*, and more specifically in the downward direction D2. The inner bottom face 302*d* forms a curved line, and more specifically, an arc-shaped line, extending in the side directions D4 and D5 in a cross section perpendicular to the lengthwise direction D3 of the lens 302.

The convex faces 302*ea* and 302*eb* each form a convex curved face that protrudes toward the inside of the concave component 302*c*, and more specifically in the side directions D5 and D4. The convex faces 302*ea* and 302*eb* form bent lines extending in the up and down directions D1 and D2 in a cross section perpendicular to the lengthwise direction D3. Furthermore, the convex faces 302*ea* and 302*eb* are inclined in a tapered shape such that the concave component 302*c* diverges toward the inner bottom face 302*d*. The lens 302 forms a convex lens at each of the convex faces 302*ea* and 302*eb*.

The widened face 302*ec* extends from one end of the inner bottom face 302*d* to the end of the convex face 302*ea*. The widened face 302*ed* extends from the other end of the inner bottom face 302*d* to the end of the convex face 302*eb*. The widened faces 302*ec* and 302*ed* widen the concave component 302*c* in the side directions D4 and D5 such that the concave component 302*c* diverges toward the inner bottom face 202*d*. The widened faces 302*ec* and 302*ed* are bent in the side directions D4 and D5 with respect to the convex faces 302*ea* and 302*eb*, respectively. In the concave component 302*c*, the space between the widened faces 302*ec* and 302*ed* is wider in the side directions D4 and D5 than the space between the convex faces 302*ea* and 302*eb*.

The inner bottom face 302*d* is wider in the side directions D4 and D5 than the space between the convex faces 302*ea* and 302*eb*. The convex faces 302*ea* and 302*eb*, which are inclined in a tapered shape so as to spread out from the light sources 101, increase the efficiency at which the light from the light sources 101 is incident on the inner bottom face 302*d*. However, the boundary 302*fa* between the inner bottom face 302*d* and the widened face 302*ec* and the boundary 302*fb* between the inner bottom face 302*d* and the widened face 302*ed* are disposed at locations where they are retracted in the side directions D4 and D5 more than the convex faces 302*ea* and 302*eb* such that diffused light emitted from the light sources 101 into the concave component 302*c* will not be directly incident.

The outer face of the lens 302 is formed by an emission face 302*g*, outer faces 302*ha* and 302*hb*, and outer bottom faces 302*ia* and 302*ib*. Like the outer faces 102*ha* and 102*hb*, the outer faces 302*ha* and 302*hb* are located in the side directions D4 and D5 with respect to the concave component 302*c*, and are inclined so as to form a tapered face that diverges and widens the lens 302 in the upward direction D1. The outer faces 202*ha* and 202*hb* each form a curved face that protrudes in a convex shape in the side directions D4 and D5. The outer faces 302*ha* and 302*hb* are inclined in the side directions D4 and D5 so as to form a shape that diverges and makes the lens 302 wider than the outer faces 102*ha* and 102*hb* in the first embodiment. In this embodiment, the outer faces 302*ha* and 302*hb* are symmetrical with respect to the center plane of the lens 302, and are formed in the same size, shape, and inclination.

The outer bottom face 302*ia* is a flat face that is located between the concave component 302*c* and the outer face 302*ha* and is abuts against the surface of the wiring board 103. The outer bottom face 302*ib* is a flat face that is located between the concave component 302*c* and the outer face 302*hb* and abuts against the surface of the wiring board 103. The light sources 101 are located at or near the open end of the concave component 302*c*.

The emission face 302*g* is formed by a central portion 302*ga* and side portions 302*gb* and 302*gc*. Like the central portion 101*ga*, the central portion 302*ga* forms a curved face that protrudes in a convex shape in the upward direction D1. In the side directions D4 and D5, the width of the central portion 302*ga* can be equal to or greater than the width of the inner bottom face 302*d*, or can be less than this width. The central portion 302*ga* is disposed such that the light that has been emitted from the light sources 101 and that has entered the lens 302 through the inner bottom face 302*d* will be incident thereon.

The side portions 302*gb* and 302*gc* are located in the side directions D4 and D5 with respect to the central portion 302*ga*, respectively, and form a flat face. The side portion 302*gb* is inclined such that the boundary 302*ge* with the outer face 302*ha* is located farther in the downward direction D2 than the boundary 302*gd* with the central portion 302*ga*. The side portion 302*gc* is inclined such that the boundary 302*gg* with the outer face 302*hb* is located farther in the downward direction D2 than the boundary 302*gf* with the central portion 302*ga*. The side portions 302*gb* and 302*gc* are inclined downward so as to reduce the lens height toward the outside in the side directions D4 and D5, respectively. In this embodiment, the side portions 302*gb* and 302*gc* are symmetrical with respect to the center plane of the lens 302, and are formed in the same size, shape, and inclination.

The above-mentioned lens 302 has a symmetrical shape with respect to the center plane of the lens 302. In the illustrated embodiment, as illustrated in FIG. 12, the convex face of the central portion 302*ga* has a different curvature from the surfaces of the side portions 302*gb* and 302*gc* and the inner bottom face 302*d*. Specifically, the convex face of the central portion 302*ga* has a larger curvature than the surfaces of the side portions 302*gb* and 302*gc* and the inner bottom face 302*d*.

3-2. Emitted Light Emitted by Lighting Device

Figure 13:
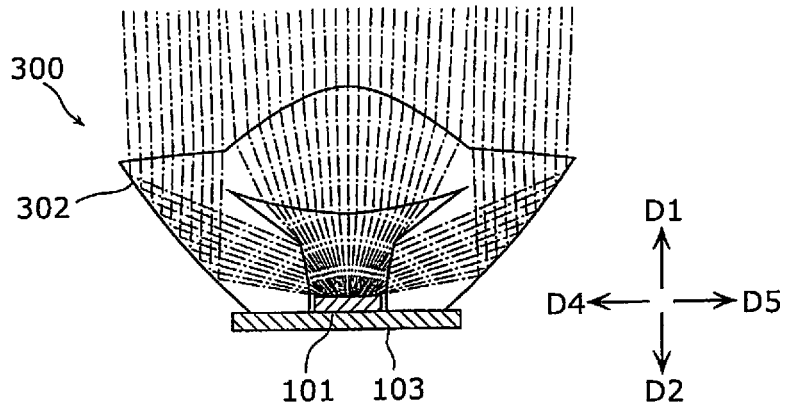
FIG. 13 is a simplified cross sectional side view of light emitted by the lighting device in FIG. 12.

The emitted light emitted by the lighting device 300 will now be described through reference to FIGS. 12 and 13. FIG. 13 is a simplified cross sectional side view of the light emitted by the lighting device 300 in FIG. 12. The diffused light emitted from the light sources 101 in the upward direction D1 enters the lens 302 from the inner bottom face 302*d* and the convex faces 302*ea* and 302*eb* as indicated by the one-dot chain line. The inner bottom face 302*d* and the convex faces 302*ea* and 302*eb* each function as a refracting face for the light emitted from the light sources 101.

The light that has entered from the inner bottom face 302*d* travels to the central portion 302*ga* of the emission face 302*g*. The light is refracted at the inner bottom face 302*d* so as to reduce its spreading in the side directions D4 and D5, and is confined to be incident on the central portion 302*ga*. Also, the light is not directly incident on the boundaries 302*fa* and 302*fb* or the widened faces 302*ec* and 302*ed*. The central portion 302*ga* functions as a refracting face for the light that has entered from the inner bottom face 302*d*. The light is refracted at the central portion 302*ga* so as to reduce its spreading in the side directions D4 and D5, and is emitted as substantially parallel light to the outside of the lens 302 in the upward direction D1.

The light that has entered from the convex face 302*ea* is refracted by the convex face 302*ea* and proceeds to the outer face 302*ha*. Since the convex face 302*ea* is inclined in a tapered shape such that the concave component 302*c* diverges toward the inner bottom face 302*d*, the light refracted by the convex face 302*ea* is oriented to a region in the downward direction D2 closer to the wiring board 103 than the light refracted by inner face 102*ea* of the first embodiment. The light is refracted so as to reduce its spreading in the up and down directions D1 and D2 at this convex face 302*ea*, and is also confined to be incident on the outer face 302*ha*, where the inclination is great in the side direction D4. The outer face 302*ha* reflects the light that has entered through the convex face 302ea toward the side portion 302gb while reducing its spreading in the side directions D4 and D5.

The side portion 302gb functions as a refracting face for the light incident from the outer face 302ha. Since the side portion 302gb is inclined in the downward direction D2 toward the outside in the side direction D4, the light incident on the side portion 302gb is refracted in the upward direction D1, and is emitted as substantially parallel light to the outside of the lens 302.

The light that has entered from the convex face 302eb behaves the same as the light that has entered from the convex face 302ea. At the side portion 302gc, substantially parallel light is emitted in the upward direction D1.

The light emitted from the central portion 302ga, the side portion 302gb, and the side portion 302gc are less likely to spread out in the side directions D4 and D5, form substantially parallel emitted light directed in the upward direction D1, and are less likely to interfere with each other. Furthermore, since the light is less likely to be incident on the boundary 302gd between the central portion 302ga and the side portion 302gb and on the boundary 302gf of the central portion 302ga and the side portion 302gc in the lens 302, interference of the light in the lens 302 is suppressed.

In this embodiment, the convex faces 302ea and 302eb each form a convex bent face that protrudes toward the inside of the lens 302 (i.e., toward the vertical center line of the lens 302 that extends along the upward and downward directions D1 and D2). However, this is not the only option, and they can instead form a convex curved face that protrudes toward the inside of the lens 302. Also, the inner bottom face 302d forms a convex curved surface that protrudes toward the inside of the lens 302 (i.e., downward in the downward direction D2). However, this is not the only option, and it can instead form a convex bent face that protrudes toward the inside of the lens 302, can form a concave curved face or bent face that is recessed toward the outside of the lens 302 (i.e., upward in the upward direction D1), or can form a flat face. The outer faces 302ha and 302hb and the central portion 302ga each form a convex curved face that protrudes toward the outside of the lens 302 (i.e., away from the vertical center line of the lens 302 or upward in the upward direction D1). However, this is not the only option, and they can instead form a convex bent face that protrudes toward the outside, or can form a flat face. The side portions 302gb and 302gc each form a flat face. However, this is not the only option, and they can instead form a convex curved or bent face that protrudes toward the outside the lens 302 (i.e., upward in the upward direction D1).

3-3. Effect

As described above, the same effect is obtained with the lighting device 300 of the third embodiment as with the lighting device 100 of the first embodiment. Furthermore, in the lens 302 of the lighting device 300 according to the third embodiment, the convex faces 302ea and 302eb of the concave component 302c are inclined in a tapered shape such that the concave component 302c diverges toward the inner bottom face 302d. With the above configuration, it is possible to control the travel direction of the light that has entered from the convex faces 302ea and 302eb in the lens 302. Consequently, the light that has entered from the convex faces 302ea and 302eb can be Confined to be incident on the outer faces 302ha and 302hb, respectively.

In addition, in the lens 302 of the lighting device 300 according to the third embodiment, the inner face of the concave component 302c includes the convex faces 302ea and 302eb and the widened faces 302ec and 302ed. The convex faces 302ea and 302eb face toward the inside of the concave component 302c. The widened faces 302ec and 302ed extend from the convex faces 302ea and 302eb to the inner bottom face 302d and widen the concave component 302c. With the above configuration, the concave component 302c is widened between the convex faces 302ea and 302eb and the inner bottom face 302d. Consequently, the light emitted from the light sources 101 into the concave component 302c can be efficiently incident on the convex faces 302ea and 302eb and the inner bottom face 302d while being prevented from being incident on the boundaries 302fa and 302fb between the inner bottom face 302d and the widened faces 302ec and 302ed.

Fourth Embodiment

A lighting device 400 according to a fourth embodiment will be described. With the lighting device 400 according to the fourth embodiment, the shape of the outer bottom face of the lens and the configuration of the light sources are different from those in the third embodiment. In this embodiment, those components that are the same as in the first to third embodiments are numbered the same and will not be described again. The following description will focus on the differences from the first to third embodiments, and things that are the same as in the first to third embodiments will not be described again.

4-1. Configuration of Lens

Figure 14:
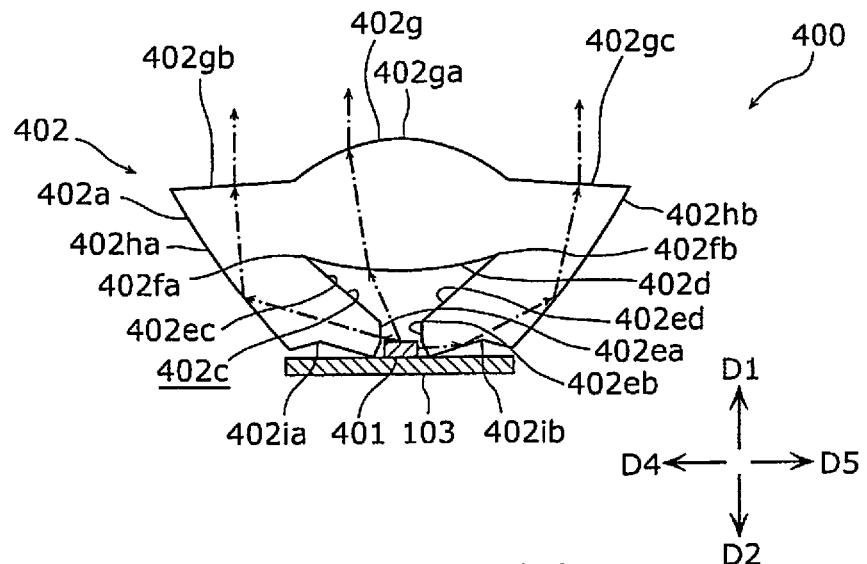
FIG. 14 is a simplified cross sectional side view of a lighting device according to a fourth embodiment, illustrating the lighting device in the same view as FIG. 5.

The configuration of the lens 402 of the lighting device 400 according to the fourth embodiment, and particularly the shape of a cross section perpendicular to the axial direction thereof, will be described through reference to FIG. 14. FIG. 14 is a simplified cross sectional side view of the lighting device 400 according to the fourth embodiment, illustrating the lighting device 400 in the same view as FIG. 5. As shown in FIG. 14, the lens 402 of the lighting device 400 comprises a lens portion 402a, but no legs.

The lens 402 has a concave component 402c (or a first concave component) in which the light sources 401 are disposed. The configuration of the concave component 402c is the same as that of the concave component 302c of the lens 302 in the third embodiment. The inner face that forms the concave component 402c is formed by an inner bottom face 402d, convex faces 402ea and 402eb, and widened faces 402ec and 402ed. The convex faces 402ea and 402eb and the widened faces 402ec and 402ed form the inner face of the concave component 402c. Since the configurations of the inner bottom face 402d, the convex faces 402ea and 402eb, and the widened faces 402ec and 402ed are the same as those in the third embodiment, they will not be described again.

Here, the light sources 401 are located at or near the open end of the concave component 402c. The light sources 101 in the first to third embodiments emit light from a single face that faces in the upward direction D1. The light sources 401 in this embodiment have a cuboid outer shape, and emit light from five of these six faces, excluding the face in contact with the wiring board 103. That is, the light source 401 emits light the faces that face in the upward direction D1, the downward direction D2, the side directions D4 and D5, and the two lengthwise directions D3.

The outer face of the lens 402 is formed by an emission face 402g, outer faces 402ha and 402hb, and outer bottom faces 402ia and 402ib (e.g., concaved bottom components or second concave components). The emission face 402g is formed by a central portion 402ga and side portions 402gb and 402gc. The configurations of the outer faces 402ha and 402hb, the central portion 402ga, and the side portions 402gb and 402gc are the same as those in the third embodiment, and therefore will not be described again.

The outer bottom face 402ia is located between the concave component 402c and the outer face 402ha and partially abuts against the surface of the wiring board 103. The outer bottom face 402ib is located between the concave component 402c and the outer face 402hb, and partially abuts against the surface of the wiring board 103. The outer bottom faces 402ia and 402ib are each recessed in the upward direction D1, which is away from the wiring board 103. The outer bottom faces 402ia and 402ib are each a bent face that forms an inverted V-shaped groove extending in the lengthwise direction of the lens 402. The outer bottom faces 402ia and 402ib form bent lines extending in the side directions D4 and D5 in a cross section perpendicular to the lengthwise direction D3 of the lens 402. The groove formed by the outer bottom faces 402ia and 402ib is an example of the concaved bottom component or second concave component. In this embodiment, the outer bottom faces 402ia and 402ib are symmetrical with respect to the center plane of the lens 402, and are formed in the same size and shape.

The lens 402 described above has a symmetrical shape with respect to the center plane of the lens 402. In the illustrated embodiment, as illustrated in FIG. 14, the convex face of the central portion 402ga has a different curvature from the surfaces of the side portions 402gb and 402gc and the inner bottom face 402d. Specifically, the convex face of the central portion 402ga has a larger curvature than the surfaces of the side portions 402gb and 402gc and the inner bottom face 402d.

4-2. Emitted Light Emitted by Lighting Device

Figure 15:
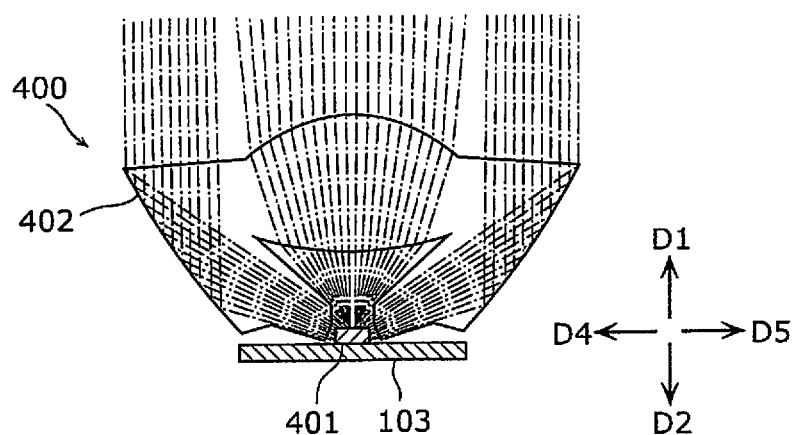
FIG. 15 is a simplified cross sectional side view of light emitted by the lighting device in FIG. 14.

Next, the emitted light emitted by the lighting device 400 will be described through reference to FIGS. 14 and 15. FIG. 15 is a simplified cross sectional side view of the light emitted by the lighting device 400 in FIG. 14. The light emitted from the five faces of each light source 401 forms diffused light in the upward direction D1, the downward direction D2, the side directions D4 and D5, and the lengthwise direction D3, as indicated by the one-dot chain lines. The light emitted from the light sources 401 enters the lens 402 from the inner bottom face 402d and the convex faces 402ea and 402eb. The light that has entered from the inner bottom face 402d exhibits the same behavior as the light that has entered the lens 302 from the inner bottom face 302d in the third embodiment, and is emitted from the central portion 402ga of the emission face 402g as substantially parallel light. The light is not directly incident on the boundaries 402fa and 402fb of the inner bottom face 402d or the widened faces 402ec and 402ed.

The light emitted from the light sources 401 is incident on the convex faces 402ea and 402eb over a region closer to the wiring board 103 than the light incident on the convex faces 302ea and 302eb in the third embodiment. For the light that has entered the lens 402 from the convex faces 402ea and 402eb, the outer bottom faces 402ia and 402ib function as reflecting faces. Therefore, when the light that has entered from the convex faces 402ea and 402eb is incident on the outer bottom faces 402ia and 402ib, it is reflected by the outer bottom faces 402ia and 402ib and directed to the outer faces 402ha and 402hb. Therefore, leakage of the light from the outer bottom faces 402ia and 402ib to the outside of the lens 402 is suppressed. Of the light that has entered the convex faces 402ea and 402eb, the light which is not incident on the outer bottom faces 402ia and 402ib is kept from spreading out very much in the up and down directions D1 and D2 and travels so as to fit within the outer faces 402ha and 402hb, as in the third embodiment. The light incident on the outer faces 402ha and 402hb exhibits the same behavior as in the third embodiment, and is emitted from the side portions 402gb and 402gc of the emission face 402g as substantially parallel light.

In this embodiment, the outer bottom faces 402ia and 402ib form concave bent faces that are recessed toward the inside of the lens 402 (i.e., upward in the upward direction D1). However, this is not the only option, and they can instead form a concave curved face, or can form a flat face that is inclined with respect to the surface of the board 103.

4-3. Effect

As described above, the same effect can be obtained with the lighting device 400 according to the fourth embodiment as with the lighting device 300 according to the third embodiment. Furthermore, in the lighting device 400 according to the fourth embodiment, the lens 402 has the outer bottom faces 402ia and 402ib (e.g., the concaved bottom component or second concave component) between the concave component 402c (e.g., the first concave component) and the outer faces 402ha and 402hb. The outer bottom faces 402ia and 402ib has surfaces that reflect the light that has entered the lens 402 through the convex faces 402ea and 402eb toward the outer faces 402ha and 402hb, respectively. With the above configuration, the outer bottom faces 402ia and 402ib make it less likely that the light that has entered the lens 402 from the convex faces 402ea and 402eb will be emitted to the outside of the lens 402 from between the concave component 402c and the outer faces 402ha and 402hb. Therefore, it is possible to control the light that has entered from the convex faces 402ea and 402eb to be incident on the outer faces 402ha and 402hb.

Other Modification Examples

The lighting device and the display device according to selected embodiments and modification examples are described above. However, the present invention is not limited to or by these embodiments. For example, the above embodiments and modification examples can be combined, as needed and/or desired.

With the lighting device according to the second to fourth embodiments, the lenses 202, 302 and 402 are illustrated without legs. However, they can be provided with legs as illustrated in the first embodiment.

In the embodiments and the modification examples, the display device 1 with the lighting device 100, 200, 300 or 400 is described as being a liquid crystal television set. However, this is not the only option. The display device can be any device having a backlight for a display panel such as a liquid crystal panel in a personal computer.

With the lighting device according to the embodiments and modification examples, the lenses 102, 202, 302 and 402 are explained as having a columnar shape. However, this is not the only option. For example, the lens can have a conical shape. With the lens such as this, the shape when viewed in a direction perpendicular to the wiring board 103 can be circular, elliptical, polygonal, or the like.

The lighting device of the present invention can be applied as a backlight for a display panel.

[1] In view of the state of the known technology and in accordance with an aspect of the present invention, a lighting device comprises at least one light source and a lens that directs light emitted from the at least one light source. The lens has a concave component with an inner bottom face and an inner face, an emission face, and an outer face. The light emitted from the at least one light source is incident on the concave component. The emission face is located on an opposite side from the concave component. The outer face is located to the side of the concave component. The inner face forms a convex face that faces toward inside of the concave component. The outer face is configured to reflect the light that has entered the lens through the inner face toward the emission face.

With this aspect, the light emitted from the light source enters the lens from the inner bottom face and the inner face of the concave component. The light that has entered from the inner bottom face travels through the lens and is emitted to the outside of the lens from the emission face. The light that has entered from the inner face travels to the outer face of the lens, is reflected by the outer face, and is emitted to the outside of the lens from the emission face. The light that has entered from the inner face is directed in a state in which it is prevented from spreading out by the inner face forming the convex face. Thus, it is efficiently incident on the outer face. Consequently, the light that has entered from the inner bottom face and the light that has entered from the inner face are emitted from the emission face in a state in which the optical path is controlled in the lens. This allows the lighting device to control the light in the lens.

[2] In accordance with a preferred embodiment according to the lighting device mentioned above, a boundary between the inner bottom face and the inner face is retracted relative to a protruding end of the inner face such that the light incident on the concave component from the at least one light source is not directly incident on the boundary.

The travel direction of the light that has entered from the boundary between the inner bottom face and the inner face of the concave component is difficult to control in the lens, and can travel in a random direction different from that of the light that has entered from the inner bottom face and the light that has entered from the inner face, which can cause various kinds of interference with the light that has entered from these faces. With this aspect, the light in the lens can be controlled by suppressing the incidence of the light at the boundary.

[3] In accordance with a preferred embodiment according to any one of the lighting devices mentioned above, the emission face has a central portion and a side portion. The central portion is arranged such that the light that has entered the lens through the inner bottom face is incident on the central portion. The side portion is located to the side of the central portion. The outer face is oriented such that the light that has entered the lens through the inner face is reflected toward the side portion.

With this aspect, the light that has entered the lens from the inner bottom face and the inner face of the concave component is emitted from the central portion and side portion, which are different regions at the emission face, respectively. This suppresses interference between the light that has entered from the inner bottom face and the light that has entered from the inner face in the lens.

[4] In accordance with a preferred embodiment according to any one of the lighting devices mentioned above, the side portion is oriented such that the light reflected by the outer face is refracted substantially in the same direction as the light emitted from the central portion.

With this aspect, interference of the light emitted to the outside of the lens from the central portion and the side portion is suppressed.

[5] In accordance with a preferred embodiment according to any one of the lighting devices mentioned above, the outer face is inclined in a tapered shape such that the lens diverges toward the emission face. The outer face forms a convex face that faces toward outside of the lens.

With this aspect, the outer face that forms the convex face and is inclined can direct the reflected light while suppressing its spreading, and can be incident in a desired region of the emission face. This makes it possible to control the light reflected at the outer face.

[6] In accordance with a preferred embodiment according to any one of the lighting devices mentioned above, the inner face is inclined in a tapered shape such that the concave component diverges away from the inner bottom face.

With this aspect, it is possible to control the travel direction of the light that has entered from the inner face of the concave component in the lens. Consequently, the light that has entered from the inner face can be confined to be incident on the outer face.

[7] In accordance with a preferred embodiment according to any one of the lighting devices mentioned above, the inner face is inclined in a tapered shape such that the concave component diverges toward the inner bottom face.

With this aspect, it is possible to control the travel direction of the light that has entered from the inner face of the concave component in the lens. Consequently, the light that has entered from the inner face can be confined to be incident on the outer face.

[8] In accordance with a preferred embodiment according to any one of the lighting devices mentioned above, the inner face includes a convex face and a widened face. The convex face faces toward the inside of the concave component. The widened face extends from the convex face to the inner bottom face and widens the concave component.

With this aspect, the concave component is widened between the convex face and the inner bottom face. Consequently, the light emitted from the light source into the concave component can be efficiently incident on the convex face and the inner bottom face while being prevented from being incident on a boundary between the inner bottom face and the widened face.

[9] In accordance with a preferred embodiment according to any one of the lighting devices mentioned above, the emission face has a central portion, a side portion and a groove portion. The central portion is arranged such that the light that has entered the lens through the inner bottom face is incident on the central portion, and that forms a convex face that faces toward outside of the lens. The side portion is located to the side of the central portion. The groove portion is disposed between the central portion and the side portion and forms a step between the central portion and the side portion. The outer face is oriented such that the light that has entered the lens through the inner face is reflected toward the side portion.

With this aspect, the groove portion suppresses the light emitted from the central portion of the emission face or the light emitted from the side portion of the emission face from entering the lens again. Consequently, interference of the light within the lens is suppressed. Also, the central portion and the side portion are stepped. Thus, the central portion can be made lower than the side portion, for example. This can make the lens more compact.

[10] In accordance with a preferred embodiment according to any one of the lighting devices mentioned above, the lens can further have a concaved bottom component between the concave component and the outer face. The concaved bottom component has a surface that is configured to reflect the light that has entered the lens through the inner face toward the outer face.

With this aspect, the concaved bottom component makes it less likely that the light that has entered the lens from the inner face will be emitted to the outside of the lens from between the concave component and the outer face. Therefore, it is possible to control the light that has entered from the inner face to be incident on the outer face.

[11] In accordance with a preferred embodiment according to any one of the lighting devices mentioned above, the lighting device further comprise a support that supports the at least one light source. The at least one light source has a plurality of light sources that are arranged in an arrangement direction. The lens is a columnar member that extends in the arrangement direction and is dividable into a plurality of lens bodies in the arrangement direction, with the lens bodies being slidably attachable to the support.

With this aspect, distortion of the lens caused by expansion and contraction due to heat can be suppressed by making up the lens with a plurality of lens bodies. Furthermore, since the lens bodies are slidable with respect to the support, stress exerted on an adjacent lens body can be suppressed even if a lens body expands or contracts due to heat.

[12] In accordance with a preferred embodiment according to any one of the lighting devices mentioned above, the lens bodies each have a mating convex component that protrudes from one end in a slide direction, and a mating concave component that is recessed from the other end in the sliding direction and mates with the mating convex component. Adjacent lens bodies are linked by mating the mating convex component and the mating concave component.

[13] In accordance with a preferred embodiment according to any one of the lighting devices mentioned above, the lens bodies each have a central portion and a side portion located to the side of the central portion, with the central portions and the side portions of the lens bodies forming the emission face of the lens. The lens bodies separately emit the light that has entered the lens bodies from the central portion and the side portion. A boundary between the mating convex component and the mating concave component is located at a boundary between the central portion and the side portion.

With these aspects, adjacent lens bodies are linked in the slide direction. The linked lens bodies are slidable relative to the support and an adjacent lens body by sliding the mating convex component and the mating concave component with respect to each other. Also, the light incident on the boundary between the mating convex component and the mating concave component can be emitted from the boundary between the central portion and the side portion. Therefore, the light incident on the boundary between the mating convex component and the mating concave component is less likely to interfere with the light emitted from the central portion, and less likely to interfere with the light emitted from the side portion.

[14] In accordance with a preferred embodiment according to any one of the lighting devices mentioned above, the lens bodies have legs that hold the lens bodies on the support, respectively. Each of the legs has a protruding portion that protrudes from one end of respective one of the lens bodies in the slide direction, and a retracting portion that is retracted from the other end of the respective one of the lens bodies in the slide direction. Adjacent lens bodies are linked by mating the protruding portion with the retracting portion on an opposite side of the mating convex component and the mating concave component with respect to the support.

With this aspect, the lens bodies are mated to the support such that the support is sandwiched from both sides by the action of mating the mating convex component and the mating concave component and mating the legs. This makes it possible to securely link the lens bodies and securely hold the lens bodies to the support.

[15] In view of the state of the known technology and in accordance with an aspect of the present invention, a display device comprises a display panel configured to display an image on a display face, and any one of the lighting devices mentioned above. The lighting device is disposed on a back face side of the display panel that is an opposite side from a display face side, and is configured to illuminate a back face of the display panel. With this aspect, the same effect as that of any one of the lighting devices mentioned above can be obtained.

[16] In accordance with a preferred embodiment according to the display device mentioned above, the lens has a columnar shape and is arranged to extend along a bottom edge of the display panel inside the display device.

[17] In accordance with a preferred embodiment according to any one of the lighting devices mentioned above, a boundary between the inner bottom face and the inner face is located outward of the lens relative to a protruding end of the convex face formed by the inner face.

[18] In accordance with a preferred embodiment according to any one of the lighting devices mentioned above, the central portion has a width that is equal to or greater than that of the inner bottom face.

[19] In accordance with a preferred embodiment according to any one of the lighting devices mentioned above, the central portion has a convex face that faces toward outside of the lens, and the side portion has a convex face that faces toward outside of the lens and has a different curvature from that of the convex face of the central portion.

[20] In accordance with a preferred embodiment according to any one of the lighting devices mentioned above, the side portion is inclined upward as moving away from the central portion.

The lighting device and the display device of the present invention makes it possible to control the light inside a lens.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a lighting device in an upright position. Accordingly, these directional terms, as utilized to describe the lighting device should be interpreted relative to a display device with a lighting device in an upright position on a horizontal surface.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A lighting device comprising:
   a plurality of light sources that are arranged in an arrangement direction;
   a lens that directs light emitted from the light sources, the lens having
      a concave component with an inner bottom face and an inner face, the light emitted from the light sources being incident on the concave component,
      an emission face located on an opposite side from the concave component, and
      an outer face located to the side of the concave component; and
   a support that supports the light sources,
   the inner face forming a convex face that faces toward inside of the concave component,
   the outer face reflecting the light that has entered the lens through the inner face toward the emission face, and
   the lens having a plurality of lens bodies, the lens bodies being independently formed as separate members and linked to each other in the arrangement direction to form a columnar member that extends in the arrangement direction, with the lens bodies being slidably attachable to the support.

2. The lighting device according to claim 1, wherein
   a boundary between the inner bottom face and the inner face is retracted relative to a protruding end of the inner face such that the light incident on the concave component from the light sources is not directly incident on the boundary.

3. The lighting device according to claim 1, wherein
   the emission face has
      a central portion that is arranged such that the light that has entered the lens through the inner bottom face is incident on the central portion, and
      a side portion that is located to the side of the central portion, and
   the outer face being oriented such that the light that has entered the lens through the inner face is reflected toward the side portion.

4. The lighting device according to claim 3, wherein
   the side portion is oriented such that the light reflected by the outer face is refracted substantially in the same direction as the light emitted from the central portion.

5. The lighting device according to claim 3, wherein
   the central portion has a width that is equal to or greater than that of the inner bottom face.

6. The lighting device according to claim 3, wherein
   the central portion has a convex face that faces toward outside of the lens, and
   the side portion has a convex face that faces toward outside of the lens and has a different curvature from that of the convex face of the central portion.

7. The lighting device according to claim 1, wherein
   the outer face is inclined in a tapered shape such that the lens diverges toward the emission face, and
   the outer face forms a convex face that faces toward outside of the lens.

8. The lighting device according to claim 1, wherein
   the inner face is inclined in a tapered shape such that the concave component diverges away from the inner bottom face.

9. The lighting device according to claim 1, wherein
   the inner face is inclined in a tapered shape such that the concave component diverges toward the inner bottom face.

10. The lighting device according to claim 1, wherein
    the inner face includes
       a convex face that faces toward the inside of the concave component, and
       a widened face that extends from the convex face to the inner bottom face and widens the concave component.

11. The lighting device according to claim 1, wherein
    the emission face has
       a central portion that is arranged such that the light that has entered the lens through the inner bottom face is incident on the central portion, and that forms a convex face that faces toward outside of the lens,
       a side portion that is located to the side of the central portion, and
       a groove portion that is disposed between the central portion and the side portion and forms a step between the central portion and the side portion, and
    the outer face is oriented such that the light that has entered the lens through the inner face is reflected toward the side portion.

12. The lighting device according to claim 1, wherein
    the lens further has a concaved bottom component between the concave component and the outer face, and
    the concave bottom component has a surface that reflects the light that has entered the lens through the inner face toward the outer face.

13. The lighting device according to claim 1, wherein
    the lens bodies each have
       a mating convex component that protrudes from one end in the arrangement direction, and a mating concave component that is recessed from the other end in the arrangement direction and mates with the mating convex component of an adjacent lens body, and adjacent lens bodies are linked by mating the mating convex component and the mating concave component.

14. The lighting device according to claim 13, wherein the lens bodies have legs that hold the lens bodies on the support, respectively, each of the legs has
- a protruding portion that protrudes from one end of respective one of the lens bodies in the arrangement direction, and
- a retracting portion that is retracted from the other end of the respective one of the lens bodies in the arrangement direction, and adjacent lens bodies are linked by mating the protruding portion with the retracting portion on an opposite side of the mating convex component and the mating concave component with respect to the support.

15. A display device comprising:
a display panel that displays an image on a display face; and
the lighting device according to claim 1, the lighting device being disposed on a back face side of the display panel that is an opposite side from a display face side, and lighting a back face of the display panel.

16. The display device according to claim 15, wherein the lens has a columnar shape and is arranged to extend along a bottom edge of the display panel inside the display device.

17. The lighting device according to claim 1, wherein a boundary between the inner bottom face and the inner face is located outward of the lens relative to a protruding end of the convex face formed by the inner face.

18. A lighting device comprising:
a plurality of light sources that are arranged in an arrangement direction;
a lens that directs light emitted from the light sources, the lens having
- a concave component with an inner bottom face and an inner face, the light emitted from the light sources being incident on the concave component,
- an emission face located on an opposite side from the concave component, and
- an outer face located to the side of the concave component; and
a support that supports the light sources,
the inner face forming a convex face that faces toward inside of the concave component,
the outer face reflecting the light that has entered the lens through the inner face toward the emission face, the lens being a columnar member that extends in the arrangement direction and is dividable into a plurality of lens bodies in the arrangement direction, with the lens bodies being slidably attachable to the support, the lens bodies each having
- a mating convex component that protrudes from one end in the arrangement direction, and
- a mating concave component that is recessed from the other end in the arrangement direction and mates with the mating convex component of an adjacent lens body, adjacent lens bodies being linked by mating the mating convex component and the mating concave component, the lens bodies each having a central portion and a side portion located to the side of the central portion, with the central portions and the side portions of the lens bodies forming the emission face of the lens, the lens bodies separately emitting the light that has entered the lens bodies from the central portion and the side portion, and a boundary between the mating convex component and the mating concave component being located at a boundary between the central portion and the side portion.

19. A lighting device comprising:
at least one light source; and
a lens that directs light emitted from the at least one light source, the lens having
- a concave component with an inner bottom face and an inner face, the light emitted from the at least one light source being incident on the concave component,
- an emission face located on an opposite side from the concave component, and
- an outer face located to the side of the concave component, the inner face forming a convex face that faces toward inside of the concave component, and
the outer face reflecting the light that has entered the lens through the inner face toward the emission face,
the emission face having
- a central portion that is arranged such that the light that has entered the lens through the inner bottom face is incident on the central portion, and
- a side portion that is located to the side of the central portion, the outer face being oriented such that the light that has entered the lens through the inner face is reflected toward the side portion, and
the side portion being inclined upward as moving away from the central portion.

* * * * *